US011615611B2

United States Patent
Kaneko et al.

(10) Patent No.: US 11,615,611 B2
(45) Date of Patent: Mar. 28, 2023

(54) SIGNAL RETRIEVAL DEVICE, METHOD, AND PROGRAM

(71) Applicant: NIPPON TELEGRAPH AND TELEPHONE CORPORATION, Tokyo (JP)

(72) Inventors: Takuhiro Kaneko, Atsugi (JP); Kaoru Hiramatsu, Atsugi (JP); Kunio Kashino, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 39 days.

(21) Appl. No.: 16/609,681

(22) PCT Filed: May 1, 2018

(86) PCT No.: PCT/JP2018/017413
§ 371 (c)(1),
(2) Date: Oct. 30, 2019

(87) PCT Pub. No.: WO2018/203551
PCT Pub. Date: Nov. 8, 2018

(65) Prior Publication Data
US 2020/0057913 A1    Feb. 20, 2020

(30) Foreign Application Priority Data
May 2, 2017    (JP) .............................. JP2017-091741

(51) Int. Cl.
*G06V 10/75*    (2022.01)
*G06K 9/62*    (2022.01)
(Continued)

(52) U.S. Cl.
CPC .......... *G06V 10/757* (2022.01); *G06F 16/535* (2019.01); *G06K 9/6215* (2013.01);
(Continued)

(58) Field of Classification Search
CPC .... G06V 10/757; G06V 10/82; G06V 40/172; G06V 40/161; G06F 16/535;
(Continued)

(56) References Cited

U.S. PATENT DOCUMENTS 10,824,942 B1 * 11/2020 Bhotika ................ G06F 16/583
2008/0052312 A1    2/2008 Tang et al.
(Continued)

FOREIGN PATENT DOCUMENTS

| JP | 2002183205 A | | 6/2002 |
| JP | 2017054210 A | | 3/2017 |
| KR | 20130059058 A | * | 6/2013 |

OTHER PUBLICATIONS

English translation of KR20130059058A (2013) (Year: 2013).*
(Continued)

*Primary Examiner* — Jon Chang
(74) *Attorney, Agent, or Firm* — Harness, Dickey & Pierce, P.L.C.

(57) ABSTRACT

A signal retrieval device includes a modification unit and a signal retrieval unit. The modification unit modifies a value of an attribute of a target represented by an input signal or a stored signals stored in a signal storage unit or a value of an attribute relating to a signal generation source of the input signal to acquire a plurality of modified values of the attribute. The signal retrieval unit retrieves a stored signal of the stored signals similar to the input signal using the input signal or the stored signals in which the attribute is modified according to each of the plurality of modified values of the attribute acquired by the modification unit.

7 Claims, 9 Drawing Sheets

(51) Int. Cl.
G06V 10/82 (2022.01)
G06N 3/04 (2006.01)
G06F 16/535 (2019.01)
G06N 3/08 (2023.01)
G06V 40/16 (2022.01)

(52) U.S. Cl.
CPC ............. G06N 3/0454 (2013.01); G06N 3/08 (2013.01); G06V 10/82 (2022.01); G06V 40/172 (2022.01)

(58) Field of Classification Search
CPC ...... G06K 9/6215; G06N 3/0454; G06N 3/08; G06N 3/0445; G06N 3/0472; G06N 3/088
See application file for complete search history.

(56) References Cited

U.S. PATENT DOCUMENTS

2011/0075950 A1* 3/2011 Ohashi ................ G06K 9/4642
382/305
2017/0068845 A1 3/2017 Saito et al.

OTHER PUBLICATIONS

Hiroshi Ishikawa, "Forest of Knowledge" Group 2-2 Chapter 2—The Institute of Electronics, Information and Communication Engineers, (2012).

Yann LeCun et al., Deep learning, Nature, vol. 521, Issue. 28, 7553, pp. 436-444, (2015).

Kaneko, Takuhiro et al., "Generative Attribute Controller with Conditional Filtered Generative Adversarial Networks," 2017 IEEE Conference on Computer Vision and Pattern Recognition (CVPR 2017), (Jul. 21, 2017), pp. 7006-7015, <DOI:10.1109/CVPR. 2017. 741>.

International Search Report for PCT/JP2018/017413; dated Jul. 17, 2018, 3 pp.

Ryosuke Tachibana et al., Semi-Supervised Learning Using Adversarial Networks, 2016 IEEE/ACIS 15th International Conference on Computer and Information Science (ICIS), Japan, IEEE, Jun. 29, 2016, pp. 1-6, [online][Aug. 28, 2020 search] Internet <URL: https://ieeexplore. ieee. org/document/7550881>.

Ian J. Goodfellow, et al., Generative Adversarial Nets, 2014 Neural Information Processing Systems, 2014 Neural Information Processing. Systems, NIPS, Dec. 11, 2014, pp. 1-9, [online], [Aug. 28, 2020 search], Internet <URL:https://papers.nips.cc/paper/5423-generative-adversarial-nets. pdf>.

* cited by examiner

SIGNAL RETRIEVAL DEVICE, METHOD, AND PROGRAM

CROSS-REFERENCE TO RELATED APPLICATIONS

This application is a 371 U.S. National Phase of International Application No. PCT/JP2018/017413, filed on May 1, 2018, which claims priority to Japanese Application No. 2017-091741, filed May 2, 2017. The entire disclosures of the above applications are incorporated herein by reference.

TECHNICAL FIELD

The present invention relates to a signal retrieval device, a method, and a program, and particularly, to a signal retrieval device, a method, and a program for retrieving a similar signal.

BACKGROUND ART

In the related art, feature amount extraction is performed on an image to extract a feature amount, and images are collated based on the feature amount (Non-Patent Literature 1).

There is a known method of encoding an image using convolutional neural networks (CNN) (Non-Patent Literature 2).

CITATION LIST

Non-Patent Literature

[Non-Patent Literature 1] Hiroshi Ishikawa, "Forest of Knowledge" Group 2-2 Chapter 2—The Institute of Electronics, Information and Communication Engineers, 2012

[Non-Patent Literature 2] "Deep learning", Yann LeCun, Yoshua Bengio, and Geoffrey Hinton, Nature, Volume 521, Issue 7553, pp. 436-444, 2015

SUMMARY OF INVENTION

Technical Problem

In the method disclosed in Non-Patent Literature 1, the accuracy of detecting the same image from a plurality of images is high. However, when a subject modifies a hairstyle or smiles and an attribute is modified, a feature amount of an image is different from the feature amount of the image before the attribute modifies, even when the same subject appears on the images. Therefore, it is less likely that the images of the same subject are recognized as similar images.

The present invention has been made in consideration of the above circumstances, and an object of the present invention is to provide a signal retrieval device, a method, and a program capable of retrieving similar signals even when an attribute is modified.

Solution to Problem

In order to attain the above object, a signal retrieval device according to a first aspect of the present invention includes: a modification unit that modifies a value of an attribute of a target represented by an input signal or stored signals stored in a signal storage unit or a value of an attribute relating to a signal generation source of the input signal to acquire a plurality of modified values of the attribute, and a signal retrieval unit that retrieves a stored signal of the stored signals similar to the input signal using the input signal or the stored signals in which the attribute is modified according to each of the plurality of modified values of the attribute acquired by the modification unit.

According to a second aspect of the present invention, in the signal retrieval device of the first aspect, the input signal and the stored signals represent image data, and the attribute represents a feature of a subject represented on the image data.

In a signal retrieval method according to a third aspect of the present invention, the signal retrieval method includes: a step of modifying a value of an attribute of a target represented by an input signal or a stored signals stored in a signal storage unit or a value of an attribute relating to a signal generation source of the input signal to acquire a plurality of modified values of the attribute; and a step of retrieving a stored signal of the stored signals similar to the input signal using the input signal or the stored signals in which the attribute is modified according to each of the plurality of modified values of the attribute acquired by the modifying step.

According to the first, second, or third aspect of the present invention, it is possible to retrieve the similar signal even when the attribute is modified, by modifying the value of the attribute represented by the input signal or the value of the attribute relating to the signal generation source of the input signal and retrieving the stored signal similar to the input signal using the signal in which the attribute is modified based on the modified value of the attribute.

A signal retrieval device according to a fourth aspect of the present invention includes: a variable extraction unit that extracts a plurality of latent variables representing features relating to an input signal or a signal generation source of the input signal; a modification unit that acquires a plurality of modified latent variables in which values of a part of the latent variables as a latent variable representing an attribute are modified among the extracted plurality of latent variables; a signal generation unit that generates a modified signal based on the plurality of modified latent variables acquired by the modification unit, the modified signal corresponding to a modified input signal in which the attribute of the input signal is modified; and a signal retrieval unit that retrieves a modified stored signal similar to the modified signal based on the modified signal generated by the signal generation unit and modified stored signals generated by modifying the latent variable representing the attribute of stored signals stored in a signal storage unit.

According to a fifth aspect of the present invention, in the signal retrieval device according to the fourth aspect, the variable extraction unit extracts the plurality of latent variables representing the features of the input signal from the input signal using a first neural network learned in advance for extracting the plurality of latent variables. The signal generation unit generates the modified signal from the plurality of modified latent variables acquired by the modification unit using a second neural network learned in advance for generating a signal. The modified stored signals are generated, using the second neural network, from a plurality of modified latent variables in which a value of the latent variable representing the attribute is modified among the plurality of latent variables extracted from the stored signals stored in the signal storage unit. The signal retrieval unit compares the modified signal generated by the signal generation unit with the modified stored signals to retrieve the modified stored signal similar to the modified signal.

In a signal retrieval method according to a sixth aspect of the present invention, the signal retrieval method includes: a step of extracting a plurality of latent variables representing features relating to an input signal or a signal generation source of the input signal; a step of acquiring a plurality of modified latent variables in which values of a part of the latent variables as a latent variable representing an attribute are modified among the extracted plurality of latent variables; a step of generating a modified input signal based on the plurality of modified latent variables acquired by the acquiring step, the modified signal corresponding to a modified input signal in which the attribute of the input signal is modified; and a step of retrieving a modified stored signal similar to the modified signal based on the modified signal generated by the generating step and modified stored signals generated by modifying the latent variable representing the attribute of stored signals stored in a signal storage unit.

According to the fourth, fifth or sixth aspect of the present invention, it is possible to retrieve the similar signal even when the attribute is modified, by extracting the plurality of latent variables representing the plurality of features relating to the input signal or the signal generation source of the input signal, modifying the plurality of extracted latent variables representing the attribute, and retrieving the signal similar to the modified signal in which the attribute is modified based on the latent variable representing the modified attribute from the modified stored signal in which the attribute is modified.

A program according to a seventh aspect of the present invention is a program for causing a computer to function as the signal retrieval device according to any of the first, second, fourth, and fifth aspects.

Advantageous Effects of Invention

With the signal retrieval device, the method, and the program of the present invention, an effect is obtained that the similar signals can be retrieved even in the case where the attribute is modified.

DESCRIPTION OF EMBODIMENTS

Hereinafter, embodiments of the present invention will be described in detail with reference to the drawings.

<Overview of First Embodiment of Present Invention>

First, an overview of a first embodiment of the present invention will be described.

There are various types of image data in the world as a portrait image of a person. For example, there are pieces of image data such as various face orientations, various lighting conditions, various ages, and various facial expressions.

Figure 1:
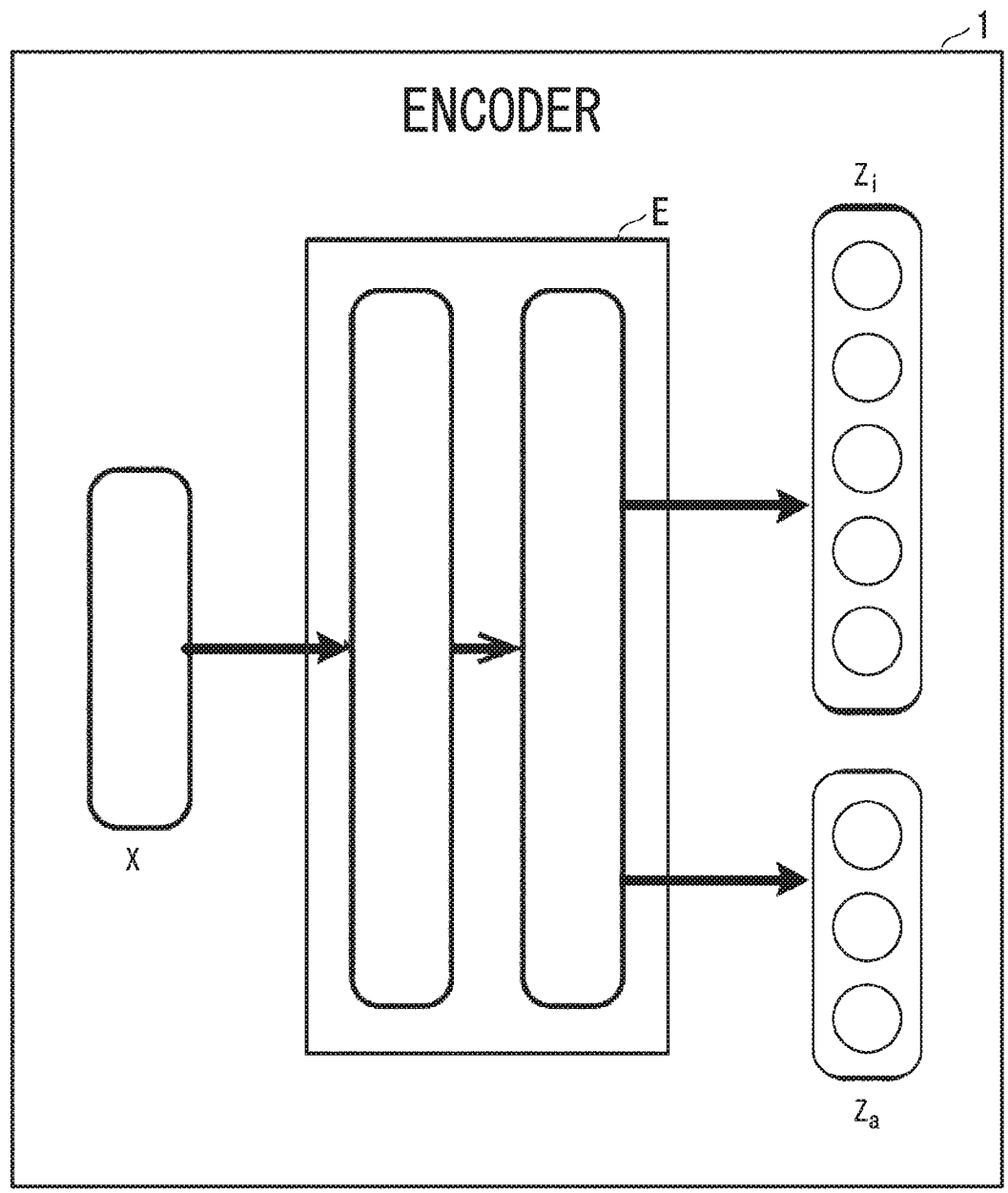
FIG. 1 is a conceptual diagram of an encoder according to a first embodiment of the present invention.

A signal retrieval device according to the first embodiment does not use an image as it is for retrieving but extracts a plurality of latent variables from the image using a neural network E as shown in FIG. 1 to perform the image retrieving based on an image obtained by modifying the latent variables. The latent variable of the image is like an essence useful for representing the image and indicates features of the image. The neural network E in an encoder 1 shown in FIG. 1 has a two-layer network and calculates latent variables $z_i$ and $z_a$ from input image data x.

In addition, there is also diversity in one attribute indicating a feature of a subject in the image. For example, even in a case of "bangs", there are various shapes of bangs.

Figure 2:
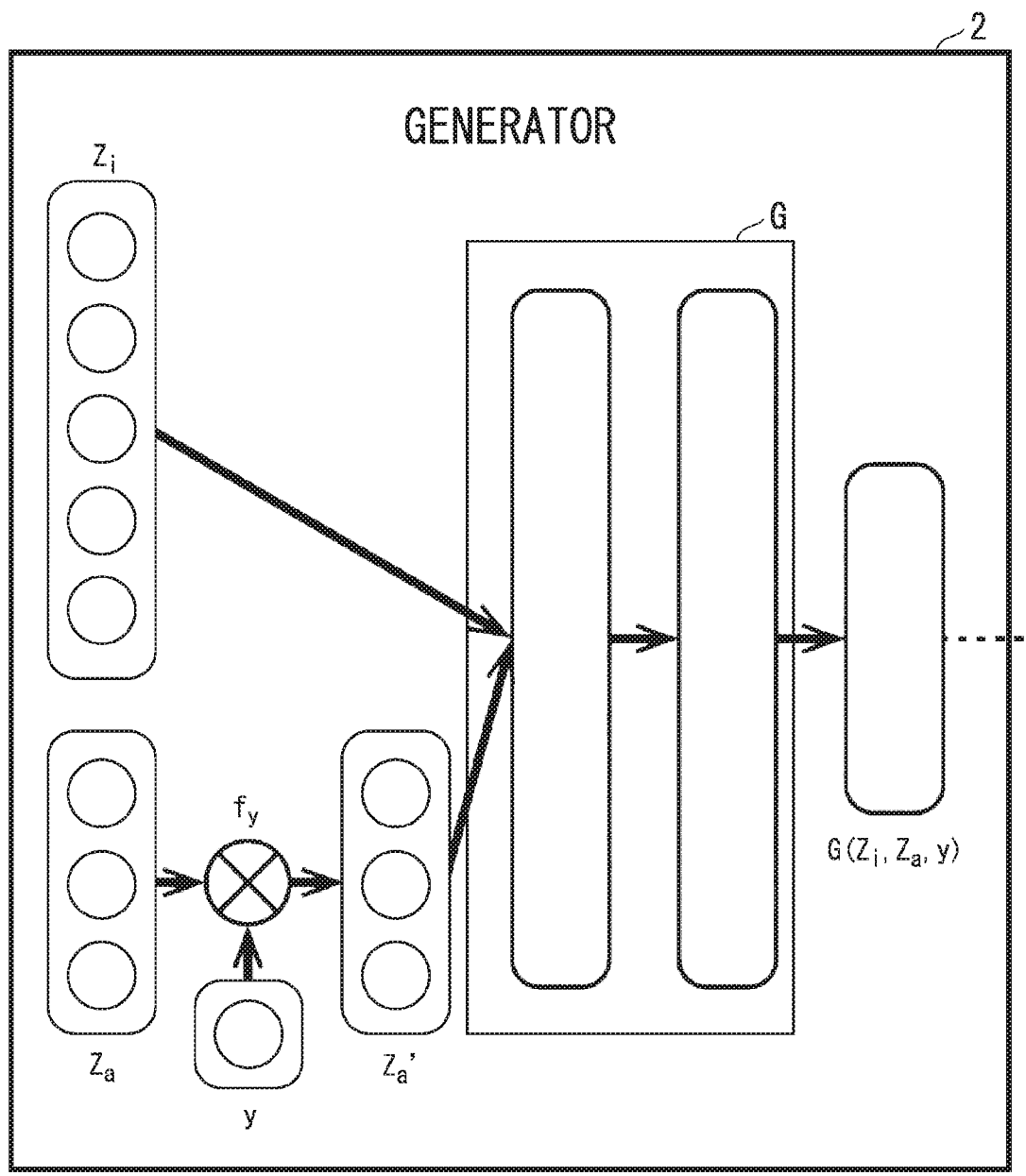
FIG. 2 is a conceptual diagram of a generator according to the first embodiment.

In the first embodiment, a generator 2 represents attributes of an image to be generated with a plurality of latent variables as shown in FIG. 2. Specifically, the plurality of latent variables are separated into an identity and attributes to make it easy to control the attributes of the image to be generated by the generator 2. The generator 2 obtains sufficient representation capability by representing each attribute using a plurality of latent variables. When the attribute is represented by a discrete value, the latent variable may be represented by continuous values which can be any values in a section defined by allowable discrete values for the attribute. The generator 2 obtains sufficient representation capability by representing each attribute using a latent variable having the continuous values. Similarly, when the attribute is represented by a certain distribution, the latent variable may be represented by a more detailed distribution than the certain distribution. The generator 2 obtains sufficient representation capability by representing each attribute using a latent variable following the more detailed distribution. The generator 2 exemplified in FIG. 2 has a neural network G including a two-layer network and generates image data $G(z_i, z_a, y)$ based on the input latent variables $z_i$ and $z_a$ and attribute vector y. In FIG. 2, the term "$f_y$" is a filter function used to convert the latent variable $z_a$. The attribute of the image is indicated by the latent variable $z_a$ which is restricted by the attribute vector y among the plurality of latent variables. The identity of the image is indicated by the latent variable $z_i$ which is not restricted by the attribute vector y among the plurality of latent variables. The attribute vector y indicates presence or absence of at least one attribute or a degree thereof.

When learning of structures of the neural networks E and G in the encoder 1 and the generator 2 is performed in a straightforward manner, the learning of the neural networks E and G in the encoder 1 and the generator 2 is performed so as to reduce an error between true data and data generated through the encoder 1 and the generator 2. In this case, there is no clear restriction on what each of the latent variable z and the attribute vector y represents.

Figure 3:
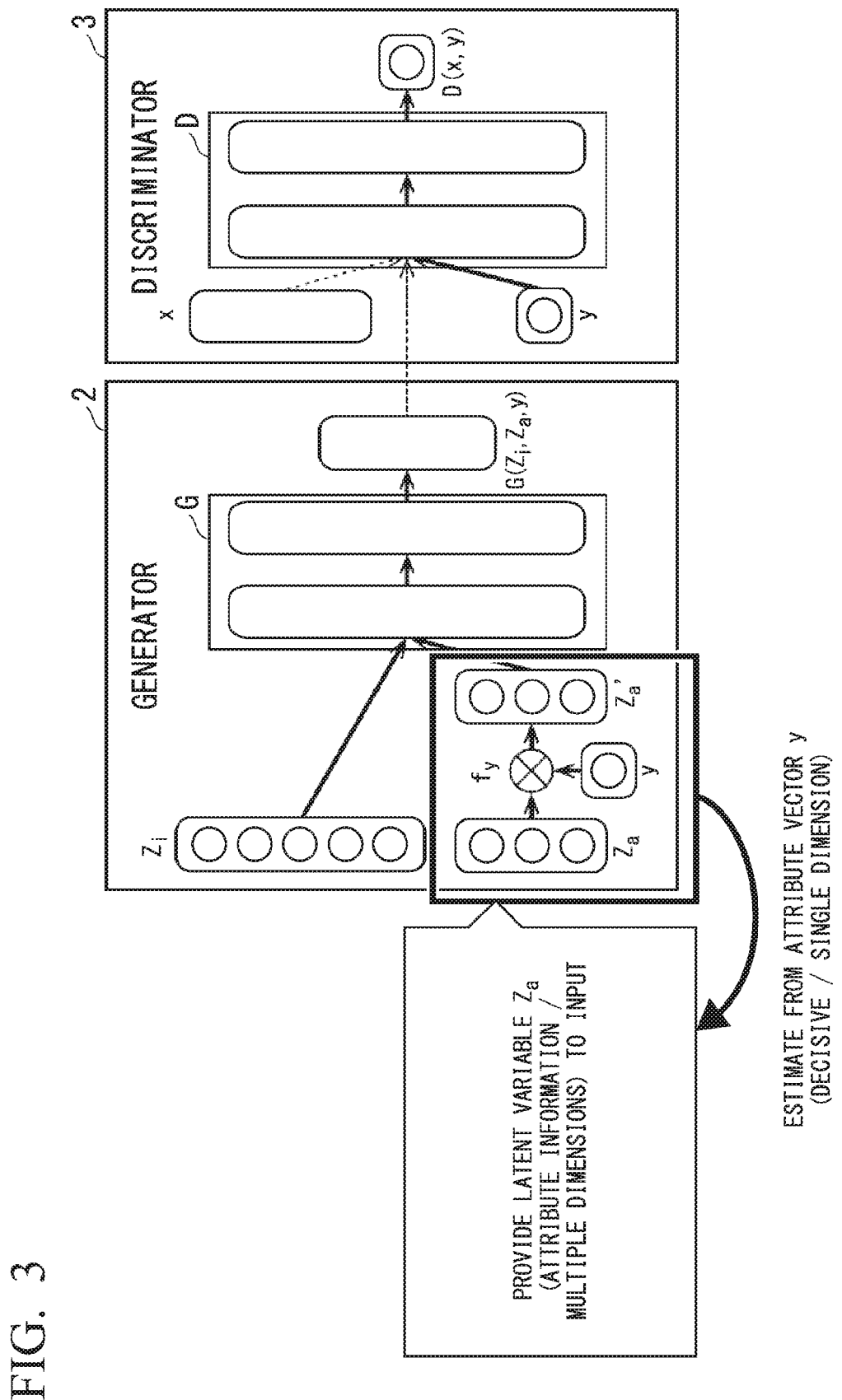
FIG. 3 is a diagram for describing a method of learning the generator and a discriminator according to the first embodiment.

In the first embodiment, conditional filtered generative adversarial networks (CFGAN) is learned together at the time of learning of the generator 2 as shown in FIG. 3. The CFGAN applies a restriction according to the attribute vector y to an image to be generated based on the latent variable z generated from a certain data distribution. The restriction corresponding to the presence or absence of a certain attribute or a degree thereof is applied to the image.

The discriminator 3 discriminates whether the generated image follows the same distribution as the true image under the restriction on attributes represented by the attribute vector y. Accordingly, it possible to apply the restriction such that various latent variables $z_i$ and $z_a$ represent the identity and the attribute, respectively. The fact that the generated image follows the same distribution as the true image means that the generated image is discriminated as the true image. The true image is used for learning and includes, for example, a plurality of predetermined images.

In the first embodiment, when the attribute of the image is modified, the modification of the attribute is performed while maintaining the identity of the image.

<Configuration of Signal Retrieval Device According to First Embodiment of Present Invention>

Figure 4:
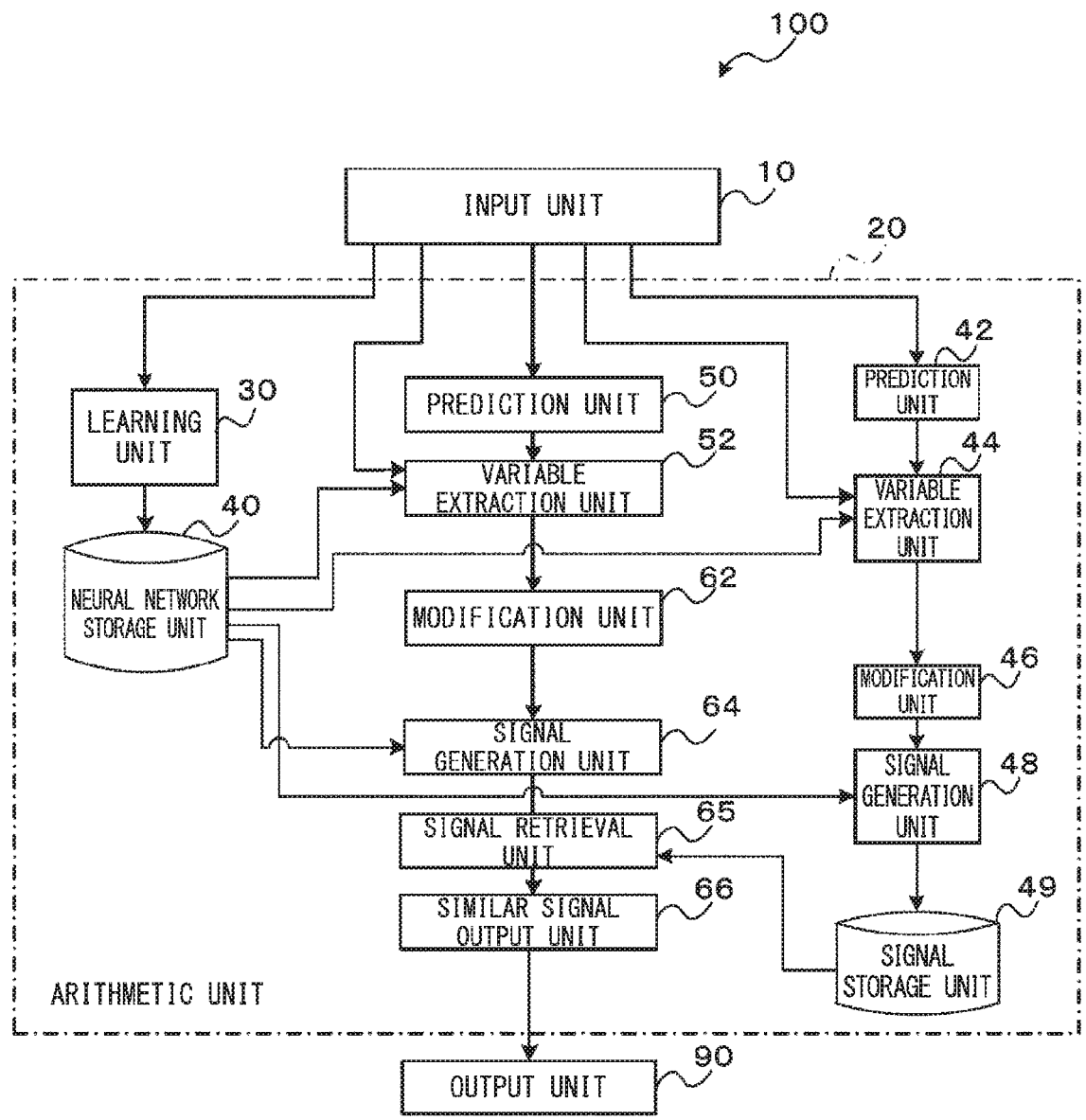
FIG. 4 is a block diagram showing a configuration of a signal retrieval device according to the first embodiment and a second embodiment.

Next, a configuration of the signal retrieval device according to the first embodiment of the present invention will be described. As shown in FIG. 4, a signal retrieval device 100 according to the first embodiment of the present invention includes an input unit 10, an arithmetic unit 20, and an output unit 90. The signal retrieval device 100 may be configured by a computer including a central processing unit (CPU), a random access memory (RAM), and a read only memory (ROM). The CPU may read a program for executing a learning processing routine and a retrieval processing routine, which will be described later, and various pieces of data stored in the ROM into the RAM, and execute the program to operate as the input unit 10, the arithmetic unit 20, and the output unit 90.

The input unit 10 receives a plurality of pieces of learning data including a pair of the image data x and the attribute vector y. The input unit 10 receives a plurality of pieces of stored image data to be retrieved and the image data x to be modified for retrieving. The attribute vector y represents, for example, the presence or absence or positive or negative of the attribute, but is not particularly limited thereto. The signal retrieval device 100 retrieves image data similar to the image data x to be modified for retrieving based on the plurality of pieces of stored image data.

The arithmetic unit 20 includes a learning unit 30, a neural network storage unit 40, a prediction unit 42, a variable extraction unit 44, a modification unit 46, a signal generation unit 48, a signal storage unit 49, a prediction unit 50, a variable extraction unit 52, a modification unit 62, a signal generation unit 64, a signal retrieval unit 65, and a similar signal output unit 66.

The learning unit 30 has the neural network G (first neural network) operating as the generator 2, a neural network D (second neural network) operating as the discriminator 3, and the neural network E operating as the encoder 1. Two neural networks G and D learn in accordance with optimization conditions competing with each other on the basis of the plurality of pieces of learning data input to the input unit 10. The neural network G receives a latent variable $z_i$ representing an identity and a latent variable $z_a'$ representing attributes which are generated from a certain data distribution, and generates image data from the latent variable $z_i$ representing the identity and the latent variable $z_a'$ representing the attributes. The neural network D receives the image data generated by the neural network G, true image data, and the attribute vector y representing the attributes of the image data, and discriminates whether the generated image data follows the same distribution as the true image data under the attribute vector y. That is, the neural network D discriminates whether the generated image data is the true image data. The true image data is included in the plurality of pieces of learning data.

The latent variable $z_a'$ representing attributes is obtained by converting the latent variable $z_a$ representing attributes by a value of the attribute vector y. As an example of the conversion, when the attribute vector y represents the presence or absence of the attribute, it is considered that the generated latent variable $z_a$ representing attributes is multiplied by the attribute vector y. Expression (1) shows an example of the conversion in this case.

[Expression. 1]

$$z_a' = \begin{cases} z_a & (y = 1) \\ 0 & (y = 0) \end{cases} \quad (1)$$

Alternatively, when the attribute vector y represents positive or negative of attributes, it is considered that positive or negative is applied to the generated latent variable $z_a$ representing attributes according to the attribute vector y. Expression (2) shows an example of the conversion in this case.

[Expression. 2]

$$z_a' = \begin{cases} |z_a| & (y = 1) \\ -|z_a| & (y = 0) \end{cases} \quad (2)$$

The learning unit 30 receives the image data x and the attribute vector y included in the learning data, and generates a latent variable $z_i$ representing an identity and a latent variable $z_a$ representing attributes from a certain data distribution. When the image data x is face image data, the attribute vector y represents the presence or absence of "glasses", "makeup", "beard", and "bangs", and discrimination of "male/female", "smiling or not-smiling face", and "old/young". The latent variable $z_a$ representing attributes represents diversity of attributes. When the attribute vector y represents the presence or absence of "glasses", the diversity of the attribute represents the shape and the color of glasses, for example. The learning unit 30 may generate the latent variable $z_i$ representing an identity and the latent variable $z_a$ representing attributes using random numbers.

When the latent variable $z_a$ representing attributes is discrete, the learning unit 30 generates the latent variable $z_a$ representing attributes according to Expression (3).

[Expression. 3]

$$z_a \sim Cat\left(K = k, p = \frac{1}{k}\right) \quad (3)$$

In Expression (3), the term "k" represents the number of categories (the number of discrete values). In addition, the term "Cat" represents a distribution composed of a value indicating each category of the number of categories K, and the term "p" represents a probability.

When the latent variable $z_a$ representing attributes is continuous, the learning unit 30 generates the latent variable $z_a$ representing attributes according to Expression (4).

[Expression. 4]

$$z_a \sim \text{Unif}(-1,1) \quad (4)$$

In Expression (4), the term "Unif(−1,1)" represents a uniform distribution in which a range of values is from −1 to 1.

It is possible to employ a latent variable $z_a$ or conversion following another distribution. For example, as the distribution of the latent variable $z_a$, it is possible to use a normal distribution instead of the uniform distribution (Unif(−1,1)). It is also possible to modify a range of values of the latent variable $z_a$.

A method of generating the latent variable $z_a$ representing the attribute is not limited to these, and the latent variable $z_a$ may be generated from any distribution such as Gaussian distribution or Dirichlet distribution. A value generated from a certain random number may be converted by another neural network and used as the latent variable $z_a$.

The learning unit 30 generates image data from the generated latent variables $z_i$ representing an identity and the generated latent variables $z_a'$ representing attributes, using the neural network G as the generator 2. The latent variable $z_a'$ representing attributes which is the input of the neural network G as the generator 2 is obtained by converting the latent variable $z_a$ representing attributes by the value of an attribute vector y.

In learning of the neural network G as the generator 2, the learning unit 30 updates a parameter of the neural network G as the generator 2 such that the discriminator 3 discriminates that the generated image data follows the same distribution as the true image data under the attribute vector y. That is, the parameter of the neural network G are updated such that the discriminator 3 discriminates the generated image as true image data.

In learning of the neural network D as the discriminator 3, the learning unit 30 updates a parameter of the neural network D as the discriminator 3 such that the discriminator 3 discriminates that the image data generated by the generator 2 does not follow the same distribution as the true image data x under the attribute vector y and the discriminator 3 discriminates that each piece of image data included in the true image data x follows the same distribution as the true image data x.

The optimization conditions in which the neural network G as the generator 2 and the neural network D as the discriminator 3 compete with each other in learning are represented by Expression (5).

[Expression. 5]

$$\min_G \max_D \mathbb{E}_{x,y \sim P_{data}(x,y)}[\log D(x, y)] + \qquad (5)$$

$$\mathbb{E}_{z_i \sim P_{z_i}(z_i), z_a \sim P_{z_a}(z_a), y \sim P_y(y)}[\log(1 - D(G(z_i, z_a, y), y))]$$

Operations included in Expression (5) and indicated by equations (6-1) to (6-4) mean as follows. The operation of Expression (6-1) represents sampling the true image data x and the attribute vector y from learning data. The operation of Expression (6-2) represents generating the latent variable $z_i$ representing an identity from a certain data distribution. For example, the latent variable $z_i$ representing an identity is generated using a random number. The operation of Expression (6-3) represents generating the latent variable $z_a$ representing attributes from a certain data distribution. For example, the latent variable $z_a$ representing attributes is generated using a random number. The operation of Expression (6-4) represents sampling the attribute vector y from learning data.

[Expression. 6]

$$x, y \sim P_{data}(x, y) \qquad (6\text{-}1)$$

$$z_i \sim P_{z_i}(z_i) \qquad (6\text{-}2)$$

$$z_a \sim P_{z_a}(z_a) \qquad (6\text{-}3)$$

$$y \sim P_y(y) \qquad (6\text{-}4)$$

The learning unit 30 performs the above processing for each piece of learning data to repeatedly and alternately update the parameter of the neural network G as the generator 2 and the parameter of the neural network D as the discriminator 3.

The neural network G as the generator 2 and the neural network D as the discriminator 3 obtained finally are stored in the neural network storage unit 40.

The learning unit 30 extracts the latent variable $z_i$ representing an identity and the latent variable $z_a$ representing attributes from the image data x included in the input learning data, using the neural network E as the encoder 1.

The learning unit 30 generates the image data from the extracted latent variable $z_i$ representing an identity and latent variable $z_a'$ representing attributes, using the neural network G as the generator 2. In this case, the latent variable $z_a'$ representing attributes is obtained by converting the latent variable $z_a$ representing attributes, output from the neural network E as the encoder 1, by the value of the attribute vector y. As an example of the conversion, it is considered that the latent variable $z_a$ representing attributes, output by the neural network E as the encoder 1, is multiplied by the attribute vector y.

In learning of the neural network E as the encoder 1, the learning unit 30 updates the parameter of the neural network E as the encoder 1 such that a restriction that the generated image data is the same as the original image data x is satisfied.

The learning unit 30 performs the above processing for each piece of learning data to repeatedly update the parameter of the neural network E of the encoder 1.

The neural network E as the encoder 1 finally obtained is stored in the neural network storage unit 40.

The prediction unit 42 inputs each of pieces of stored image data received by the input unit 10 to a neural network (for example, CNN) learned in advance as a predictor (not shown) for predicting the attribute vector y to predict the attribute vector y.

The neural network as the predictor outputs the attribute vector y. The attribute vector y is, for example, a classification of the presence or absence or positive or negative of attributes. However, the attribute vector y is not particularly limited to these.

The variable extraction unit 44 receives the plurality of pieces of stored image data and extracts a latent variable $z_i$ representing an identity and a latent variable $z_a$ representing attributes of each piece of stored image data using the neural network E as the encoder 1 stored in the neural network storage unit 40. The variable extraction unit 44 obtains the latent variable $z_a'$ representing the attributes based on the extracted latent variable $z_a$ representing the attributes and the attribute vector y predicted by the prediction unit 42. In this case, the latent variable $z_a'$ representing attributes is obtained by converting the latent variable $z_a$ representing the attributes extracted by the variable extraction unit 44 by the value of the attribute vector y predicted by the prediction unit 42. As an example of the conversion, it is considered that the latent variable $z_a$ representing the attributes is multiplied by the attribute vector y. Since the latent variable $z_a$ representing the attributes has the plurality of latent variables for each attribute, the elements of the attribute vector y are multiplied by all of the plurality of latent variables corresponding to the attributes.

The modification unit 46 modifies a value of the latent variable representing the attribute to be modified among the latent variables included in the latent variable $z_a'$ representing the attributes to acquire a plurality of latent variables $z_a'$ representing the attributes in which the value of the latent variable representing the attribute to be modified is modified. The modification unit 46 may modify the value of the latent variable representing the attribute to be modified using a random number. Alternatively, the modification unit 46 may continuously modify the value of the latent variable when the value of the latent variable representing the attribute to be modified is a continuous value, or may modify the value of the latent variable $z_a'$ using each discrete value when the value of the latent variable representing the attribute to be modified is a discrete value (category value).

The modification unit 46 replaces the value of the latent variable representing the attribute to be modified among the latent variables $z_a'$ representing the attributes obtained by the variable extraction unit 44 with the modified value of the latent variable to obtain the plurality of latent variables $z_a'$ representing the modified attribute.

In addition, when there are a plurality of attributes to be modified, the modification unit 46 repeats the above processing for each of the attributes to be modified to obtain the plurality of latent variables $z_a'$ representing the modified attribute.

The signal generation unit 48 generates modified stored image data, for each latent variable $z_a'$ representing the modified attributes obtained by the modification unit 46, from the latent variable $z_i$ representing the identity extracted by the variable extraction unit 44 and the latent variable $z_a'$ representing the modified attributes, using the neural network G as the generator 2 stored in the neural network storage unit 40. That is, the signal generation unit 48 generates the image data for each latent variable $z_a'$ obtained by modifying the value of the latent variable $z_a'$ representing the attributes extracted from the stored image data. The plurality of pieces of image data (stored modified image data) generated for each piece of stored image data are pieces of image data having diversity for the attribute represented by the predicted attribute vector y.

The signal storage unit 49 stores the plurality of pieces of stored modified image data generated by the signal generation unit 48 for each piece of stored image data. Each piece of stored modified image data stored in the signal storage unit 49 is obtained by modifying the latent variable $z_a'$ representing the attributes.

The prediction unit 50 inputs the image data to be modified received by the input unit 10 to the neural network learned in advance as the predictor for predicting the attribute vector y to predict the attribute vector y of the image data to be modified. The image data to be modified is used when similar image data is retrieved from the plurality of pieces of stored image data.

The variable extraction unit 52 receives the input image data x to be modified and extracts the latent variable $z_i$ representing the identity and the latent variable $z_a$ representing the attributes of the image data x to be modified using the neural network E as the encoder 1 stored in the neural network storage unit 40. The variable extraction unit 52 obtains the latent variable $z_a'$ representing the attributes based on the extracted latent variable $z_a$ representing the attributes and the attribute vector y predicted by the prediction unit 50. In this case, the latent variable $z_a'$ representing the attributes is obtained by converting the latent variable $z_a$ representing the attributes extracted by the variable extraction unit 52 by the value of the attribute vector y predicted by the prediction unit 50.

Similar to the modification unit 46, the modification unit 62 modifies the value of the latent variable representing the attribute to be modified among the latent variables included in the latent variable $z_a'$ representing the attributes to acquire the plurality of latent variables $z_a'$ representing the attributes in which the value of the latent variable representing the attribute to be modified is modified.

The modification unit 62 replaces the value of the latent variable representing the attribute to be modified among the latent variables included in the latent variable $z_a'$ representing the attributes obtained by the variable extraction unit 52 with the modified value to modify the value of the latent variable representing the attribute to be modified. The modification unit 62 obtains the plurality of latent variables $z_a'$ representing the attributes in which the value of the latent variable representing the attribute to be modified is modified.

In addition, when there are the plurality of attributes to be modified, the modification unit 62 repeats the above processing for each attribute to be modified to obtain the plurality of latent variables $z_a'$ representing the modified attributes.

The signal generation unit 64 generates the modified image data, for each latent variable $z_a'$ representing the modified attributes obtained by the modification unit 62, from the latent variable $z_i$ representing the identity extracted by the variable extraction unit 52 and the latent variable $z_a'$ representing the modified attributes, using the neural network G as the generator 2 stored in the neural network storage unit 40. That is, the signal generation unit 64 generates the image data for each latent variable $z_a'$ obtained by modifying the value of the latent variable $z_a'$ extracted from the image data x to be modified. The plurality of pieces of image data generated from the image data x to be modified have diversity for the attribute represented by the predicted attribute vector y.

The signal retrieval unit 65 compares each piece of modified image data generated by the signal generation unit 64 with each piece of stored modified image data stored in the signal storage unit 49 to retrieve the stored modified image data similar to the modified image data generated by the signal generation unit 64. In the case where the pieces of image data are compared with each other, a degree of similarity obtained by comparing known feature amounts of the pieces of image data may be used. The signal retrieval unit 65 may output stored modified image data in which the degree of similarity to the modified image data is equal to or larger than a threshold value, as a retrieval result. The signal retrieval unit 65 may sort the retrieval results in order of the degree of similarity and output the retrieval results in a ranking form.

The similar signal output unit 66 causes the output unit 90 to display the stored modified image data retrieved by the signal retrieval unit 65 as a retrieval result. The output unit 90 may output the stored modified image data included in the retrieval result output from the signal retrieval unit 65 to an external device.

<Operation of Signal Retrieval Device According to First Embodiment of Present Invention>

An operation of the signal retrieval device 100 according to the first embodiment of the present invention will be described. The signal retrieval device 100 executes the learning processing routine and the retrieval processing routine described below.

Figure 5:
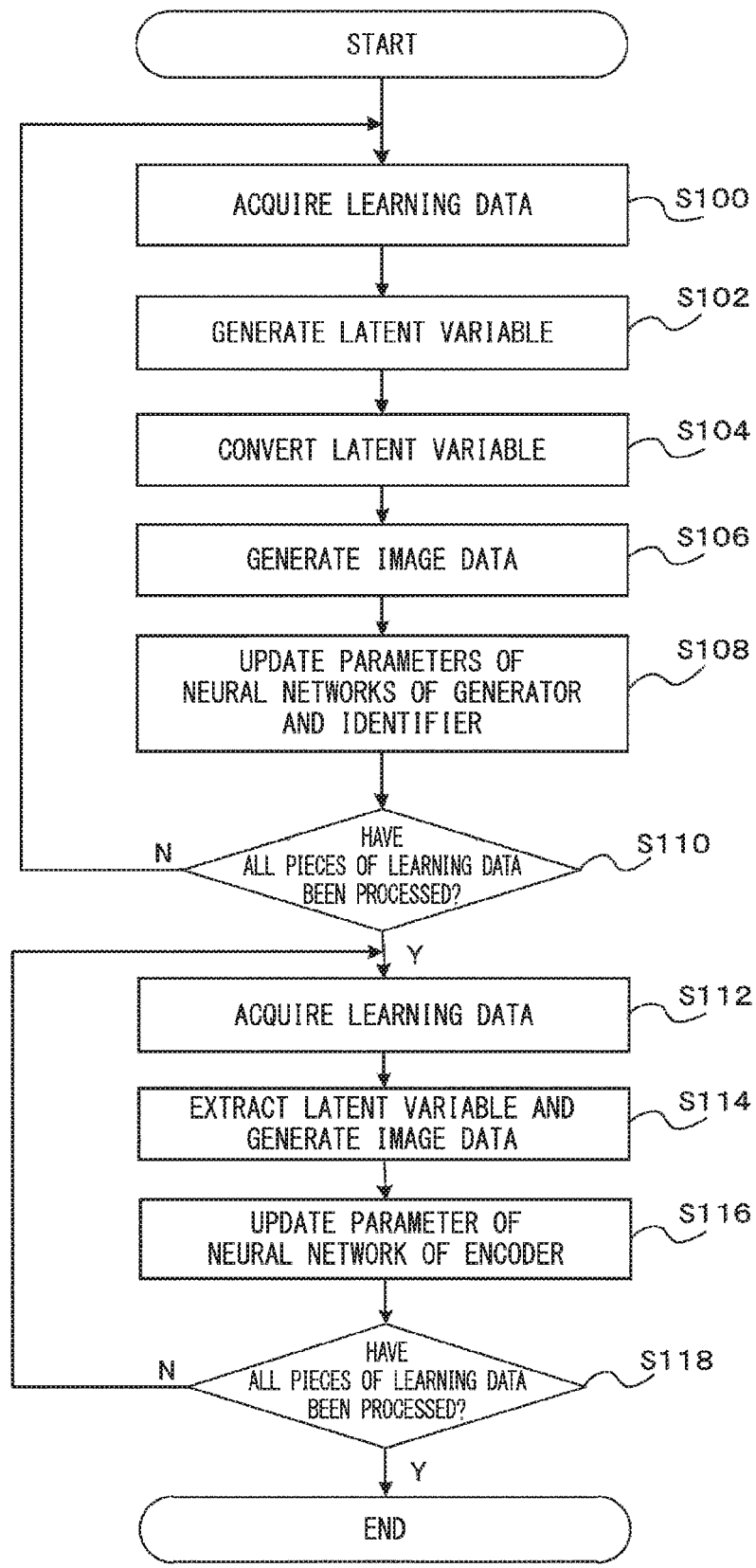
FIG. 5 is a flowchart showing a learning processing routine of the signal retrieval device according to the first and second embodiments.

The learning processing routine will be described. In a case of receiving a plurality of pairs of image data x and attribute vector y as the learning data in the input unit 10, the signal retrieval device 100 executes a learning processing routine shown in FIG. 5.

In step S100, the learning unit 30 acquires any one of the plurality of pieces of learning data received by the input unit 10.

In step S102, the learning unit 30 generates the latent variable $z_i$ representing the identity and the latent variable $z_a$ representing the attributes from a certain data distribution.

In step S104, the learning unit 30 converts the latent variable $z_a$ representing the attributes generated in step S102 by the value of the attribute vector y included in the learning data acquired in step S100 to obtain the latent variable $z_a'$ representing the attributes.

In step S106, the learning unit 30 generates image data $x^p$ from the latent variable $z_i$ representing the identity generated in step S102 and the conversion result $z_a'$ of the latent variable representing the attributes obtained in step S104, using the neural network G as the generator 2.

In step S108, the learning unit 30 updates the parameters of the neural network G as the generator 2 and the parameters of the neural network D as the discriminator 3 on the basis of the latent variable $z_i$ representing the identity and the latent variable $z_a$ representing the attributes which are generated in step S102, the generated image data, the image data $x^p$ generated in step S106, and the image data x and the attribute vector y included in the learning data obtained in step S100.

In step S110, it is determined whether the learning unit 30 executes the processes of steps S100 to S108 for all pieces of learning data. When there is learning data that is not used in the processes of steps S100 to S108, the learning unit 30 returns to step S100 and acquires the learning data. When all pieces of learning data are used in the processes of steps S100 to S108, the learning unit 30 stores the parameter of the neural network G as the generator 2 and the parameter of the network D as the discriminator 3 which are finally obtained in the neural network storage unit 40.

In step S112, the learning unit 30 acquires any one of the plurality of pieces of learning data received by the input unit 10.

In step S114, the learning unit 30 extracts the latent variable $z_i$ representing the identity and the latent variable $z_a'$ representing the attributes from the image data x and the attribute vector y included in the learning data obtained in step S112, using the neural network E as the encoder 1. The learning unit 30 generates the image data from the extracted latent variable $z_i$ representing the identity and latent variable $z_a'$ representing the attributes, using the neural network G as the generator 2. In this case, the latent variable $z_a'$ representing the attributes is obtained by converting the extracted latent variable $z_a$ representing the attributes by the value of the attribute vector y corresponding to the image data x.

In step S116, the learning unit 30 updates the parameter of the neural network E as the encoder 1 on the basis of the generated image data and the image data x included in the learning data obtained in step S112.

In step S118, it is determined whether the learning unit 30 executes the processes of steps S112 to S116 for all pieces of learning data. When there is learning data that is not used in the processes of steps S112 to S116, the learning unit 30 returns to step S112 and acquires the learning data. When all pieces of learning data are used in the processes of steps S112 to S116, the learning unit 30 ends the learning processing routine. The learning unit 30 stores the parameters of the neural network E as the encoder 1 finally obtained in the neural network storage unit 40.

When the input unit 10 receives the plurality of pieces of stored image data, the prediction unit 42 inputs each piece of stored image data received by the input unit 10 to the neural network learned in advance as the predictor for predicting the attribute vector y to predict the attribute vector y of each piece of stored image data.

The variable extraction unit 44 extracts the latent variable $z_i$ representing the identity and the latent variable $z_a$ representing the attributes for each piece of stored image data, using the neural network E as the encoder 1 stored in the neural network storage unit 40. The variable extraction unit 44 obtains the latent variable $z_a'$ representing the attributes based on the extracted latent variable $z_a$ representing attributes and the attribute vector y predicted by the prediction unit 42.

The modification unit 46 modifies the value of the latent variable representing the attribute to be modified among the latent variables included in the latent variable $z_a'$ representing the attributes obtained from each piece of stored image data to acquire the plurality of latent variables $z_a'$ representing the attributes in which the value of the latent variable representing the attribute to be modified is modified. The modification unit 46 obtains the plurality of latent variables $z_a'$ representing the modified attributes for each piece of stored image data.

The signal generation unit 48 generates modified stored image data, for each latent variable $z_a'$ representing the modified attributes obtained by the modification unit 46, from the latent variable $z_i$ representing the identity extracted by the variable extraction unit 44 and the latent variable $z_a'$ representing the modified attributes, using the neural network G as the generator 2 stored in the neural network storage unit 40.

The signal storage unit 49 stores the plurality of pieces of stored modified image data generated by the signal generation unit 48 for each piece of the stored image data. The plurality of pieces of stored modified image data stored in the signal storage unit 49 has diversity for the attribute represented by the attribute vector y predicted from each piece of stored image data.

Figure 6:
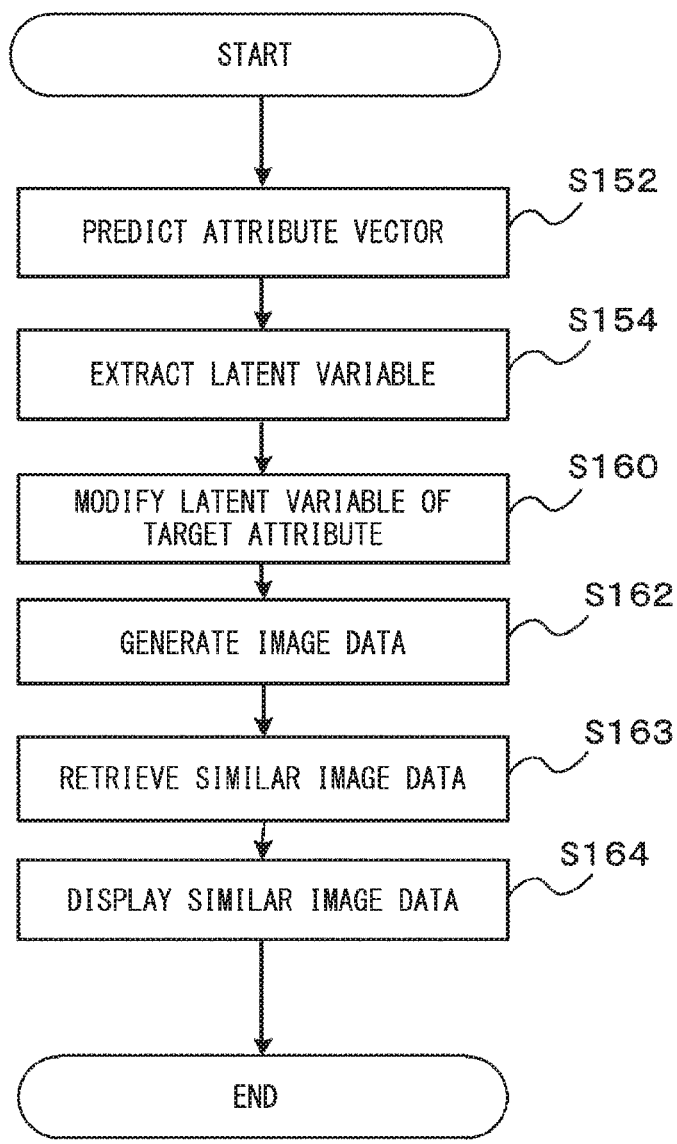
FIG. 6 is a flowchart showing a retrieval processing routine of the signal retrieval device according to the first and second embodiments.

The retrieval processing routine will be described. When the input unit 10 receives the image data to be modified, the signal retrieval device 100 executes the retrieval processing routine shown in FIG. 6.

In step S152, the prediction unit 50 predicts the attribute vector y based on the image data to be modified received by the input unit 10, using the neural network learned in advance as the predictor.

In step S154, the variable extraction unit 52 extracts the latent variable $z_i$ representing the identity and the latent variable $z_a$ representing the attributes from the image data to be modified received by the input unit 10, using the neural network E as the encoder 1 stored in the neural network storage unit 40. The variable extraction unit 52 obtains the latent variable $z_a'$ representing the attributes based on the extracted latent variable $z_a$ representing the attributes and the attribute vector y predicted in step S152. In this case, the latent variable $z_a'$ representing the attributes is obtained by converting the extracted latent variable $z_a$ representing the attributes by the value of the predicted attribute vector y.

In step S160, the modification unit 62 modifies the value of the latent variable representing the attribute to be modified among the latent variables included in the latent variable $z_a'$ representing the attributes obtained in step S154 to acquire the plurality of latent variables $z_a'$ representing the attributes in which the value of the latent variable representing the attribute to be modified is modified.

In step S162, the signal generation unit 64 generates the modified image data, for each latent variable $z_a'$ representing the modified attributes obtained in step S160, from the latent variable $z_i$ representing the identity extracted in step S154 and the latent variable $z_a'$ representing the modified attributes, using the neural network G as the generator 2 stored in the neural network storage unit 40. The plurality of pieces of modified image data generated by the signal generation unit 64 has diversity for the attribute indicated by the attribute vector y predicted in step S152.

In step S163, the signal retrieval unit 65 compares each piece of modified image data generated in step S162 with each of the plurality of pieces of stored modified image data stored in the signal storage unit 49 to retrieve the stored modified image data similar to the generated modified image data.

In step S164, the similar signal output unit 66 causes the output unit 90 to display the stored modified image data retrieved in step S163 as the retrieval result and ends the retrieval processing routine.

As described above, the signal retrieval device according to the first embodiment of the present invention extracts the latent variable representing the identity and the latent variable representing the attributes of the image data to be modified for retrieving. The signal retrieval device modifies the extracted latent variable representing the attributes and retrieves the image data similar to the modified image data in which the attribute is modified from the stored modified image data in which the attribute is modified based on the latent variable representing the modified attributes. By performing a signal retrieval method including the above operation, the signal retrieval device can retrieve the similar image data even when the attribute is modified. That is, even when the stored image data or the stored modified image data has an attribute different from the attribute included in the image data to be modified for retrieving, the signal retrieval device can retrieve the image similar to the image data from the stored image data or the stored modified image data.

The signal retrieval device extracts the latent variable of the input image data using the neural network E as the encoder 1 and modifies the value of the extracted latent variable. The signal retrieval device generates the image data from the modified latent variable using the neural network G as the generator 2 and thus can generate image data in which the attribute is modified. For example, when it is desired to modify only an attribute related to the glasses, the latent variable $z_i$ representing the identity may be fixed in the input to the signal generation unit and each dimension of the latent variable $z_a$ representing the attribute in multiple dimensions may be interactively modified. When it is desired to modify only the identity while maintaining the attribute, the latent variable $z_a$ representing the attributes may be fixed in the input of the signal generation unit and the latent variable $z_i$ representing the identity may be modified.

Since the signal retrieval device according to the first embodiment of the present invention has the plurality of latent variables for each attribute, it is possible to represent the diversity of the attribute. In addition, the signal retrieval device can control the value of only one latent variable of the plurality of latent variables for one attribute.

The signal retrieval device according to the first embodiment of the present invention generates the latent variable representing the identity and the latent variable representing the attributes in image data. The signal retrieval device causes the neural network G as the generator 2 that generates the image and the neural network D as the discriminator 3 that discriminates whether the generated image data follows the same distribution as the true image data under the attribute vector to learn in accordance with optimization condition competing with each other, based on the true image data included in the input learning data, the generated latent variable representing the identity, and the latent variable representing the attributes. The signal retrieval device can learn the neural network G as the generator 2 capable of generating the image data while controlling the attribute of the image by performing the learning processing routine including the above operations.

It is described that the learning unit 30 learns the neural network G as the generator 2 and the neural network D as the discriminator 3 in accordance with the competitive optimization conditions as an example in the first embodiment, but the invention is not limited thereto. For example, a restriction may be further provided such that each latent variable represents an independent one. Specifically, a restriction is further provided such that a correlation (information amount) between the latent variable $z_a'$ and the image data generated from the latent variable $z_a'$ shown in Expression (7) increases.

[Expression. 7]

$$I(z_a'; G(z_i, z_a, y) \mid y) = H(z_a' \mid y) - H(z_a' \mid G(z_i, z_a, y), y) = \qquad (7)$$

$$H(z_a' \mid y) + \mathbb{E}_{x \sim G(z_i, z_a, y)}\left[\mathbb{E}_{z_a' \sim P(z_a' \mid x, y)}[\log P(\hat{z}_a' \mid x, y)]\right] = H(z_a' \mid y) +$$

$$\mathbb{E}_{x \sim G(z_i, z_a, y)}\left[D_{KL}(P(\cdot \mid x, y) \| Q(\cdot \mid x, y) + \mathbb{E}_{z_a' \sim P(z_a' \mid x, y)}[\log Q(\hat{z}_a' \mid x, y)]\right] \geq$$

$$H(z_a' \mid y) + \mathbb{E}_{x \sim G(z_i, z_a, y)}\left[\mathbb{E}_{z_a' \sim P(z_a' \mid x, y)}[\log Q(\hat{z}_a' \mid x, y)]\right] =$$

$$H(z_a' \mid y) + \mathbb{E}_{z_a' \sim P(z_a' \mid y), x \sim G(z_i, z_a')}[\log Q(z_a' \mid x, y)].$$

In the Expression (7), the term "$I(z_a'; G(z_i,z_a,y)|y)$" represents a mutual information amount between the image to be generated under the attribute vector y and the latent variable $z_a'$ representing the attributes. The term "$H(z_a'|y)$, $H(z_a'|G(z_i,z_a,y),y)$" represents conditional entropy. The term "E" represents an expected value. The term "DKL" represents Kullback-Leibler (KL) divergence. The term "$P(z_a'|x, y)$" represents the distribution of the latent variable $z_a'$ representing respective attributes when the true image data x and the attribute vector y included in the learning data are applied. The term "$\hat{z}_a'$" (ˆ is attached on top of $z_a$) is a latent variable obtained according to the distribution of $P(z_a'|x,y)$.

Since $P(z_a'|x,y)$ is unknown, it is difficult to directly obtain the information amount I. Therefore, approximation distribution $Q(z_a'|x,y)$ is introduced as described above. The learning unit 30 learns the neural network Q that estimates the approximation distribution $Q(z_a'|x,y)$ so that the lower limit of the information amount I is maximized using the calculus of variations and performs optimization of the competitive optimization conditions. In this way, when a plurality of latent variables for the attribute of "glasses" include a latent variable $z_a^1$ and a latent variable $z_a^2$, the latent variable $z_a^1$ for the attribute of "glasses" represents sunglasses, and the latent variable $z_a^2$ represents glasses other than sunglasses.

In the first embodiment, it is described that the neural network E as the encoder 1 simultaneously estimates the latent variable $z_a$ representing the attributes and the latent variable $z_i$ representing the identity as an example. However, the estimation method of the latent variable is not limited thereto. For example, the neural network E as the encoder 1 may directly estimate the latent variable $z_a'$ representing the attributes instead of the latent variable $z_a$ representing the attributes and thus simultaneously estimate the latent variable $z_a'$ representing the attribute and the latent variable $z_i$ representing the identity.

When the neural network G as the generator 2 is learned together with the neural network Q that estimates the approximate distribution Q ($z_a'|x,y$), the learning unit 30 may estimate the latent variable $z_a'$ representing the attributes using the neural network Q estimating the approximate distribution. Furthermore, the neural network E as the encoder 1 may estimate only the latent variable $z_i$ representing the identity.

The optimal latent variable $z_i$ representing the identity may be obtained by inputting any latent variable $z_i$ representing the identity to the neural network G as the generator 2 without using the neural network E as the encoder 1 and updating the latent variable $z_i$ representing the identity using a gradient method such that an output of the neural network G as the generator 2 is closer to the target image x. In addition, the optimal latent variable $z_i$ representing the identity may be obtained by obtaining the latent variable $z_a'$ representing the attribute and the latent variable $z_i$ representing the identity using the neural network E as the encoder 1, then inputting the latent variable $z_i$ representing the identity to the neural network G as the generator 2 with the latent variables as initial values, and updating the latent variable $z_i$ representing the identity using the gradient method such that an output of the neural network G as the generator 2 is closer to the target image x. In addition, the neural network E as the encoder 1 or the neural network as the predictor may be learned together with the neural network G as the generator 2 and the neural network D as the discriminator 3.

<Overview According to Second Embodiment of Present Invention>

Next, a configuration of a signal retrieval device according to a second embodiment of the present invention will be described. The signal retrieval device according to the second embodiment is the same as the signal retrieval device according to the first embodiment. Therefore, the same reference numeral is assigned and the description thereof is omitted.

The second embodiment differs from the first embodiment in that the latent variable representing attributes has a hierarchical structure.

Figure 7:
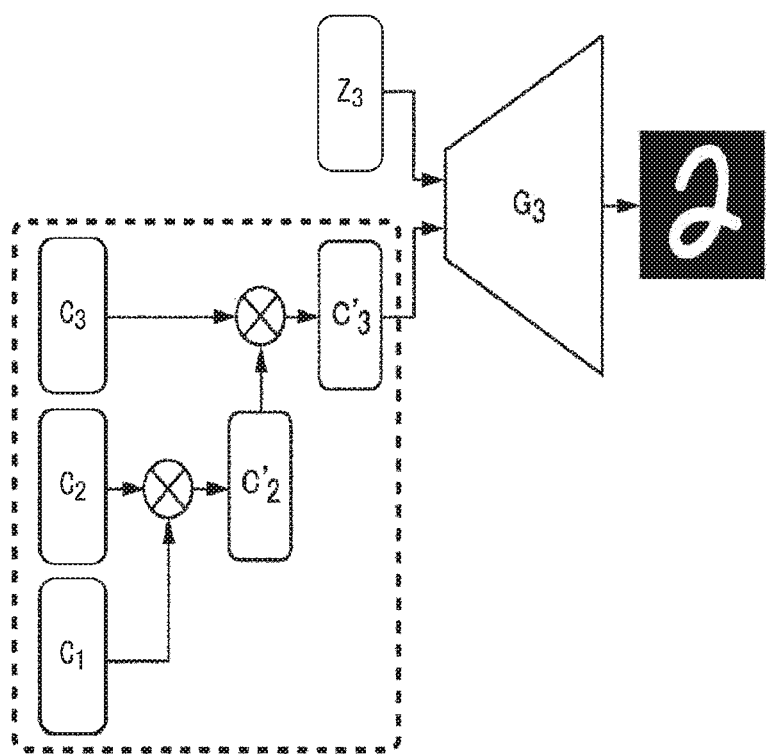
FIG. 7 is a conceptual diagram of a generator, a discriminator, and an approximate distribution according to the second embodiment.

In the second embodiment, the signal retrieval device 100 performs hierarchical control on an attribute. In order to realize this control, the learning unit 30 has a structure in which a latent variable representing attributes is a hierarchical latent variable having two or more hierarchies and is hierarchically converted as shown in FIG. 7. A first-layer latent variable $c_1$ is a latent variable representing attributes of the first layer and corresponds to the attribute vector y in the first embodiment. The latent variable represents, for example, the presence or absence or positive or negative of an attribute but is not particularly limited thereto.

A second-layer latent variable $c_2$ is converted by a value of the first-layer latent variable $c_1$, and a conversion result $c_2'$ is obtained. A third-layer latent variable $c_3$ is converted by a value of the conversion result $c_2'$ of the second-layer latent variable $c_2$, and a conversion result $c_3'$ is obtained. In the third layer, the signal retrieval device 100 sets a latent variable $z_3$ representing the identity and the conversion result $c_3'$ as the latent variable representing attributes as the inputs of the generator, and generates image data by a neural network $G_3$ as the generator. The signal retrieval device 100 compares the pieces of image data with each other to retrieve modified stored image data similar to modified image data.

Figure 8:
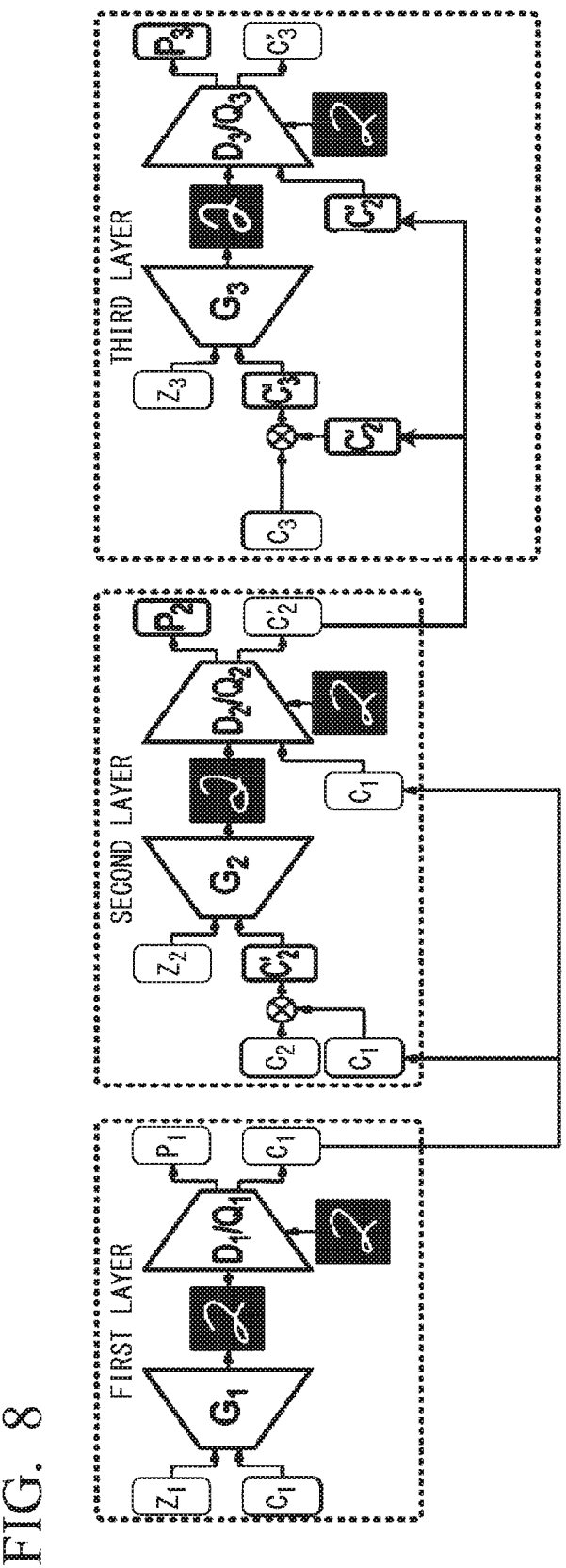
FIG. 8 is a conceptual diagram of the generator according to the second embodiment.

In learning of a neural network, as shown in FIG. 8, a neural network $G_1$ that generates image data, a neural network $D_1$ as the discriminator, and a neural network $Q_1$ that estimates a distribution of the latent variable $c_1$ are learned using the first-layer latent variable $c_1$ and the latent variable $z_1$ representing the identity as the inputs. A neural network $G_2$ that generates image data, a neural network $D_2$ as the discriminator, and a neural network $Q_2$ that estimates a distribution of the latent variable $c_2$ are learned using the conversion result $c_2'$ of the second-layer latent variable and the latent variable $z_2$ representing the identity as the inputs. A neural network $G_3$ that generates image data, a neural network $D_3$ as the discriminator, and a neural network $Q_3$ that estimates a distribution of the latent variable $c_3'$ are performed with the conversion result $c_3'$ of the third-layer latent variable and the latent variable $z_3$ representing the identity as the inputs. The learning in each layer is performed sequentially. P1, P2, and P3 in FIG. 8 represent discrimination results of the neural networks $D_1$, $D_2$, and $D_3$ as discriminators, respectively.

As described above, the signal retrieval device 100 first learns each neural network corresponding to the first-layer latent variable and recursively performs learning of respective neural networks corresponding to latent variables of one-step-deeper layer on the basis of the learning results to thereby learn the respective neural networks for each layer. By hierarchical learning, an abstractive concept is first acquired in a shallow layer, and the diversity of attributes can be gradually refined as the layer deepens.

<Configuration of Signal Retrieval Device According to Second Embodiment of Present Invention>

The input unit 10 of the signal retrieval device 100 according to the second embodiment of the present invention receives the plurality of pieces of image data x as the learning data. In addition, the input unit 10 receives the plurality of pieces of stored image data to be retrieved and the image data x to be modified for retrieving. The signal retrieval device 100 retrieves the image data similar to the image data x to be modified for retrieving based on the plurality of pieces of stored image data.

The learning unit 30 generates the latent variables $z_i$ ($z_1$, $z_2$, $z_3$) representing an identity and the latent variables $c_1$, $c_2$, and $c_3$ representing attributes in each hierarchy from a certain data distribution. It is considered that each latent variable represents, for example, the presence or absence or positive or negative of the attributes in each hierarchy, but the invention is not particularly limited thereto. The learning unit 30 may generate the latent variables $z_i$ ($z_1$, $z_2$, $z_3$) representing the identity and the latent variables $c_1$, $c_2$, and $c_3$ representing the attributes in each hierarchy using random numbers.

The learning unit 30 has the neural networks $G_1$, $G_2$, and $G_3$ operating as generators, the neural networks $D_1$, $D_2$, and $D_3$ operating as discriminators, and the neural networks $Q_1$, $Q_2$, and $Q_3$ that estimate the distributions of the latent variables $c_1$, $c_2'$, and $c_3'$.

The neural networks $G_1$, $G_2$, and $G_3$ as the generators receive the generated latent variable $z_i$ representing the identity and the latent variables $c_1$, $c_2$, and $c_3$ representing attributes in each hierarchy as the input and generate the image data from the latent variable $z_i$ representing the identity and the latent variables $c_1$, $c_2$, and $c_3$ representing the attributes. The neural networks $D_1$, $D_2$, and $D_3$ operating as discriminators discriminate whether the image data generated by the neural networks $G_1$, $G_2$, and $G_3$ follows the same distribution as the true image data. The neural networks $Q_1$, $Q_2$, and $Q_3$ estimate the approximate distributions of $P(c_1|x)$, $P(c_2'|x,c_1)$, and $P(c_3'|x,c_1,c_2')$ for the latent variables $c_1$, $c_2'$, and $c_3'$ representing the attributes of the image data generated by the neural networks $G_1$, $G_2$, and $G_3$. The neural networks $Q_1$, $Q_2$, and $Q_3$ estimate the latent variables $c_1$, $c_2'$, and $c_3'$ representing the attributes on the basis of the estimated approximate distributions.

The neural networks operating as the generators and the discriminators learn in accordance with competitive optimization conditions on the basis of the plurality of pieces of learning data input to the input unit 10. At the same time, the neural networks $Q_1$, $Q_2$, and $Q_3$ learn so as to maximize the lower limit of the information amount of the image data generated by the neural networks $G_1$, $G_2$, and $G_3$. The learning unit 30 performs learning recursively and repeatedly on the neural networks of the respective layers. For example, a CNN may be used as the respective neural networks of the learning unit 30.

Specifically, the learning unit 30 receives, for the first layer, the true image data x included in the input learning data, the generated latent variable $z_1$ representing the identity, and the generated latent variable $c_1$ representing attributes of the first layer as the input.

The learning unit 30 generates image data using the neural network $G_1$ as the generator using the generated latent variable $z_1$ representing the identity and the latent variable $c_1$ representing the attributes of the first layer as the input to the neural network $G_1$.

In learning of the neural network $G_1$ as the generator, the learning unit 30 updates parameters of the neural network $G_1$ so that the discriminator discriminates that the generated image data follows the same distribution as the true image data. That is, the parameters of the neural network $G_1$ are updated so that the neural network $D_1$ as the discriminator discriminates that the generated image is true image data.

In learning of the neural network $D_1$ as the discriminator, the learning unit 30 updates the parameters of the neural network $D_1$ as the discriminator so that the discriminator discriminates that the image data generated by the generator does not follow the same distribution as the true image data and that the discriminator discriminates that the respective pieces of image data included in the true image data x follow the same distribution as the true image data.

The neural network $Q_1$ predicts the latent variable $c_1$ representing the attributes of the first layer with respect to the image data generated by the neural network $G_1$ as the generator. In learning of the neural network $Q_1$, the learning unit 30 updates the parameters of the neural network $Q_1$ so that the lower limit of the correlation (an information amount) between the latent variable $c_1$ and the image data generated from the latent variable $c_1$ is maximized.

The learning unit 30 receives, for the second layer, the true image data x included in the input learning data, the latent variable $c_1$ representing the attributes of the first layer predicted by the neural network $Q_1$, the generated latent variable $z_2$ representing the identity, and the generated latent variable $c_2$ representing the attributes of the second layer as the input. In this case, the latent variable $c_2'$ representing the attributes of the second layer is obtained by converting the latent variable $c_2$ representing the attributes of the second layer using the value of the latent variable $c_1$ representing the attributes of the first layer. As an example of conversion, the latent variable $c_2$ representing the attributes of the second layer and the latent variable $c_1$ representing the attributes of the first layer may be multiplied.

The learning unit 30 generates image data using the neural network $G_2$ as the generator using the generated latent variable $z_2$ representing the identity and the conversion result $c_2'$ of the generated latent variable $c_2$ representing the attributes of the second layer as the input to the neural network $G_2$.

In learning of the neural network $G_2$ as the generator, the learning unit 30 updates the parameters of the neural network $G_2$ as the generator so that the discriminator discriminates that the generated image data follows the same distribution as the true image data under the latent variable $c_1$ representing the attributes of the first layer. That is, the parameter of the neural network $G_2$ is updated so that the neural network $D_2$ as the discriminator discriminates that the generated image is true image data.

In learning of the neural network $D_2$ as the discriminator, the learning unit 30 updates the parameters of the neural network $D_2$ as the discriminator so that the discriminator discriminates that the image data generated by the generator does not follow the same distribution as the true image data under the latent variable $c_1$ representing the attributes of the first layer and that the discriminator discriminates that the respective pieces of image data included in the true image data x follow the same distribution as the true image data.

The neural network $Q_2$ predicts the latent variable $c_2'$ representing the attributes of the second layer with respect to the image data generated by the neural network $G_2$ under the latent variable $c_1$ representing the attributes of the first layer. In learning of the neural network $Q_2$, the learning unit 30 updates the parameters of the neural network $Q_2$ so that the lower limit of the correlation (an information amount) between the latent variable $c_2'$ and the image data generated from the latent variable $c_2'$ is maximized.

The learning unit 30 receives, for the third layer, the true image data x included in the input learning data, the latent variable $c_2'$ representing the attributes of the second layer predicted by the neural network $Q_2$, the generated latent variable $z_3$ representing the identity, and the generated latent variable $c_3$ representing the attributes of the third layer as the input. In this case, the latent variable $c_3'$ representing the attributes of the third layer is obtained by converting the latent variable $c_3$ representing the attributes of the third layer using the value of the conversion result $c_2'$ of the latent variable $c_2$ representing the attributes of the second layer.

The learning unit 30 generates image data using the neural network $G_3$ as the generator using the generated latent variable $z_3$ representing the identity and the conversion result $c_3'$ of the generated latent variable $c_3$ representing the attributes of the third layer as the input to the neural network $G_3$.

In learning of the neural network $G_3$ as the generator, the learning unit 30 updates the parameters of the neural network $G_3$ as the generator so that the discriminator discriminates that the generated image data follows the same distribution as the true image data under the conversion result $c_2'$ of the latent variable $c_2$ representing the attributes of the second layer. That is, the parameters of the neural network $G_3$ are updated so that the neural network $D_3$ as the discriminator discriminates that the generated image is true image data.

In learning of the neural network $D_3$ as the discriminator, the learning unit 30 updates the parameters of the neural network $D_3$ as the discriminator so that the discriminator discriminates that the image data generated by the generator does not follow the same distribution as the true image data under the conversion result $c_2'$ of the latent variable $c_2$ representing the attributes of the second layer and the discriminator discriminates that the respective pieces of image data included in the true image data x follow the same distribution as the true image data.

The neural network $Q_3$ predicts the latent variable $c_3'$ representing the attributes of the third layer with respect to the image data generated by the neural network $G_3$ under the conversion result $c_2'$ of the latent variable $c_2$ representing the attributes of the second layer. In learning of the neural network $Q_3$, the learning unit 30 updates the parameters of the neural network $Q_3$ so that the lower limit of the correlation (an information amount) between the latent variable $c_3'$ and the image data generated from the latent variable $c_3'$ is maximized.

The learning unit 30 performs the above-described process for respective pieces of learning data to repeatedly update the parameters of various neural networks.

The neural networks $G_1$, $G_2$, and $G_3$ as the generators, the neural networks $D_1$, $D_2$, and $D_3$ as the discriminators, and the neural networks $Q_1$, $Q_2$, and $Q_3$ obtained finally are stored in the neural network storage unit 40.

The learning unit 30 receives the image data x included in the input learning data and estimates the latent variables $z_i$ ($z_1, z_2, z_3$) representing the identity using the neural network as the encoder. The learning unit 30 extracts the latent variables $c_2'$ and $c_3'$ representing the attributes using the neural networks $Q_2$ and $Q_3$ that estimate the approximate distributions.

The learning unit 30 receives the estimated latent variable $z_3$ representing the identity and the latent variable $c_3'$ representing attributes, and generates the image data using the neural network $G_3$ as the generator.

The learning unit 30 updates the parameters of the neural network as the encoder so that a restriction that the generated image data is the same as the original image data x is satisfied.

The learning unit 30 performs the above processes for each piece of learning data and repeatedly updates the parameter of the neural network E as the encoder.

The neural network E as the encoder finally obtained is stored in the neural network storage unit 40.

The prediction unit 42 inputs the stored image data received by the input unit 10 to the neural network $Q_1$ learned in advance as the predictor for predicting the first-layer latent variable $c_1$ representing attributes to predict the first-layer latent variable $c_1$ representing the attributes. It is considered that the latent variable $c_1$ representing attributes output from the neural network $Q_1$ indicates, for example, the presence or absence or a degree of the attributes in the stored image data, but the invention is not particularly limited thereto. The presence or absence of the attribute is indicated by, for example, a binary value of 0 and 1, or a positive or negative value.

The variable extraction unit 44 inputs the stored image data to the neural network E as the encoder stored in the neural network storage unit 40 and estimates the latent variable $z_i$ representing the identity of the stored image data using the encoder. The variable extraction unit 44 inputs the stored image data to the neural networks $Q_2$ and $Q_3$ to extract the latent variables $c_2'$ and $c_3'$ representing the attributes of the second and subsequent layers using the neural networks $Q_2$ and $Q_3$.

The modification unit 46 modifies the value of the latent variable representing the attribute to be modified among the latent variables $c_1$, $c_2'$, or $c_3'$ representing the attributes to acquire the plurality of latent variables $c_1$, $c_2'$, or $c_3'$ representing the attributes in which the value of the latent variable representing the attributes to be modified is modified. When the value of the latent variable $c_1$ representing the attribute is modified, the values of the latent variables $c_2'$ and $c_3'$ representing the relevant attributes are also modified. When the value of the latent variable $c_2'$ representing the attribute is modified, the value of the latent variable $c_3'$ representing the relevant attribute is also modified.

The modification unit 46 replaces the value of the latent variable representing the attribute to be modified among the latent variables $c_3'$ representing the attributes obtained by the variable extraction unit 44 with the modified value of the latent variable to obtain the plurality of latent variables $c_3'$ representing the modified attributes.

The signal generation unit 48 generates the image data using the neural network $G_3$ as the generator stored in the neural network storage unit 40 using the latent variable $z_i$ representing the identity extracted by the variable extraction unit 44 and the latent variable $c_3'$ representing the attributes modified by the modification unit 46 as the input to the generator.

The signal storage unit 49 stores each piece of stored modified image data generated by the signal generation unit 48 for each piece of stored image data.

The prediction unit 50 inputs the image data to be modified received by the input unit 10 to the neural network $Q_1$ learned in advance as the predictor for predicting the first-layer latent variable $c_1$ representing the attributes to predict the first-layer latent variable $c_1$ representing the attributes. It is considered that the latent variable $c_1$ representing the attributes output from the neural network $Q_1$ indicates, for example, the presence or absence or a degree of the attributes in the image data to be modified, but the invention is not particularly limited thereto. The presence or absence of the attribute is indicated by, for example, a binary value of 0 and 1, or a positive or negative value.

The variable extraction unit 52 estimates the latent variable $z_i$ representing the identity of the image data x to be modified from the input image data x to be modified using the neural network E as the encoder stored in the neural network storage unit 40. The variable extraction unit 52 extracts the latent variables $c_1$, $c_2'$, and $c_3'$ representing the attributes from the input image data x to be modified using the neural networks $Q_1$, $Q_2$, and $Q_3$.

The modification unit 62 modifies the value of the latent variable representing the attribute to be modified among the latent variables $c_1$, $c_2'$, or $c_3'$ representing the attributes extracted by the variable extraction unit 52 to acquire the plurality of latent variables $c_1$, $c_2'$, or $c_3'$ representing the attributes in which the value of the latent variable representing the attribute to be modified is modified. When the value of the latent variable $c_1$ representing the attribute is modified, the values of the latent variables $c_2'$ and $c_3'$ representing the relevant attributes are also modified. When the value of the latent variable $c_2'$ representing the attribute is modified, the value of the latent variable $c_3'$ representing the relevant attribute is also modified.

The modification unit 62 replaces the value of the latent variable representing the attribute to be modified with the modified value among the latent variables $c_3'$ representing the attributes obtained by the variable extraction unit 52 with the modified value of the latent variable to obtain the plurality of latent variables $c_3'$ representing the modified attributes.

The signal generation unit 64 generates the image data using the neural network $G_3$ as the generator stored in the neural network storage unit 40 using the latent variable $z_3$ representing the identity extracted by the variable extraction unit 52 and the latent variable $c_3'$ representing the attributes modified by the modification unit 62 as the input to the generator.

The other configuration and operation of the signal retrieval device 100 according to the second embodiment are the same as those of the first embodiment, and thus the description thereof is omitted.

As described above, the signal retrieval device according to the second embodiment modifies the values of the latent variable representing the attributes of the first layer and the conversion result of the latent variable representing the attributes of the second or third layer. The signal retrieval device generates the modified image data in which the attribute is modified using the neural network as the generator using the latent variable representing the identity extracted by the neural network as the encoder and the conversion result of the latent variable representing the modified attributes of the third layer as the input to the generator. The signal retrieval device retrieves the image data similar to the modified image data obtained by modifying the latent variable representing the attributes from the stored modified image data obtained by modifying the latent variable representing the attributes. The modified image data and the stored modified image data generated using the latent variable representing the attributes in which the value of the latent variable representing the attribute is modified have the diversity for the attribute. By using the modified image data and the stored modified image data having the diversity, the signal retrieval device can retrieve similar image data even when the attribute is modified.

The present invention is not limited to the above embodiments, and various changes and applications can be made within the scope not departing from the spirit of the present invention.

For example, the signal retrieval device includes the learning unit that performs the learning of the neural network in the above embodiments, but the invention is not limited thereto. For example, the invention may be divided and configured into a learning device including the learning unit and the neural network storage unit 40, and a signal retrieval device including a prediction unit, a variable extraction unit, a modification unit, a signal generation unit, a signal storage unit, a signal retrieval unit, and a similar signal output unit.

In addition, the case where the signal to be input is the face image data is described as an example in the above embodiments. However, the signal to be input is not limited thereto and may be image data other than the face. For example, the signal to be input may be character image data. In this case, the attribute vector y represents the presence or absence of each of character types (for example, a, b, c, . . . , 1, 2, . . . ). The latent variable $z_a$ representing the attribute represents the character diversity. For example, when the attribute vector y represents a character "4", the diversity of the character represents the size or the shape of "4".

Alternatively, the attribute vector y represents the presence or absence of each of character fonts (for example, gothic font, mincho font, bold, italic, . . . ), and the latent variable $z_a$ representing the attribute represents the diversity of a font. For example, when the attribute vector y represents the gothic font, the diversity of a font represents a type of the gothic font.

In addition, the signal to be input may be animal image data (for example, bird image data). In this case, the attribute vector y represents the presence or absence of a color, and the latent variable $z_a$ representing an attribute represents the diversity of a color. For example, the attribute vector y represents the presence or absence of red, and the latent variable $z_a$ represents a red part of a bird or the tinge of red.

Alternatively, the attribute vector y represents the shape of each part of a bird and the latent variable $z_a$ representing an attribute represents the diversity of each part of a bird. For example, the attribute vector y represents whether a distal end of a beak is round or sharp and the latent variable $z_a$ represents the roundness of the beak.

The input signal may be background image data. In this case, the attribute vector y represents a background type and the latent variable $z_a$ representing an attribute represents the diversity of a background type. For example, the attribute vector y represents the presence or absence of a sea, a mountain, a river, a house, or a road and the latent variable $z_a$ represents which sea, mountain, river, house, or road is included In addition, the input signal may be house image data. In this case, the attribute vector y represents the presence or absence of a color and the latent variable $z_a$ representing an attribute represents the diversity of a color. For example, the attribute vector y represents the presence or absence of red and the latent variable $z_a$ represents a red part of a house or the shade of red.

The input signal may be structure image data. In this case, the attribute vector y represents the presence or absence of each structure type and the latent variable $z_a$ representing an attribute represents the diversity of a structure. For example, the attribute vector y represents the presence or absence of a building, a detached house, and a tower, and the latent variable $z_a$ represents the shape of a structure.

Alternatively, the attribute vector y represents the presence or absence of the shape of parts of a structure and the latent variable $z_a$ representing an attribute represents the diversity of parts. For example, the attribute vector y represents the presence or absence of a flat roof, a round roof, and a triangular roof and the latent variable $z_a$ represents the flatness of the roof.

In the above-described embodiments, a case in which the input signal is image data has been described as an example. However, the input signal is not limited to this and may be a signal other than the image data. For example, the input signal may be audio signal (or a music signal), text data, or video data.

When the input signal is audio signal, the signal retrieval device may generate a latent variable representing the identity and a latent variable representing attributes, and the neural network as the generator may generate the audio signal. The latent variable representing the attributes may represent an attribute related to a person who is a generation source of the audio signal or an attribute related to an element that forms the audio signal. For example, an attribute related to a person who is a generation source of an audio signal represents the presence or absence of charm, emotion, dialect, and the like, the gender of the person, and the age of the person. An attribute related to an element that forms the audio signal represents the speed, the voice pitch, and the like of a speech. After extracting the latent variable representing the identity and the latent variable representing the attributes, the signal retrieval device modifies the latent variable representing the attribute, thereby reconstructing the audio signal having diversity for the attributes.

When the input signal is text data, the signal retrieval device may generate a latent variable representing the identity and a latent variable representing attributes, and the neural network as a generator may generate text data. The latent variable representing the attributes may represent an attribute related to a person which is a generation source of the text data and an attribute related to an element that forms the text data. For example, the attribute related to a person represents politeness, the gender of the person, and the like. The attribute related to the element represents whether the text is abstractive or concrete, whether the text is emotional, the genre of the text, whether the text is colloquial or literary, and whether the text is formal. After extracting the latent variable representing the identity and the latent variable representing the attributes, the signal retrieval device modifies the latent variable representing the attribute, thereby reconstructing the text data having diversity for the attributes.

When the input signal is video data, the signal generation device may generate a latent variable representing the identity and a latent variable representing attributes, and the neural network as the generator may generate video data. The latent variable representing the attributes represents an attribute related to an element that forms the video data. For example, the attribute related to an element represents a comical degree, whether the video is old or new, whether the video is live filming or animation, the presence or absence of emotion, the genre of the video, and the like. After extracting the latent variable representing the identity and the latent variable representing the attributes, the signal retrieval device modifies the latent variable representing the attribute, thereby reconstructing the video data having diversity for the attributes.

The signal retrieval device may correct the reconstructed image data in consideration of a reconstruction error included in the reconstructed image data. For example, the signal retrieval device may modify the latent variable representing the attributes according to Expression (8) and correct image data $x_{mod}$ generated using the neural network as the generator.

[Expression. 8]

$$\tilde{x} = x_{rec} + M\Delta + (1-M)\Delta'$$

$$\Delta = x_{mod} - x_{rec}$$

$$\Delta' = x - x_{rec} \quad (8)$$

In Expression (8), the term "$x_{rec}$" represents reconstructed image data without modifying the latent variable representing the attributes, and the term "x" represents image data to be modified. The term "$\Delta$" represents a difference image between the image data $x_{mod}$ reconstructed by modifying the value of the latent variable representing the attributes and the image $x_{rec}$ reconstructed without modifying the value of the latent variable. The term "$\Delta'$" represents a difference image between the image data x to be modified and the image $x_{rec}$ reconstructed without modifying the value of the latent variable. The term "~x" (~ is attached on top of x) represents image data obtained by correction. The term "M" represents a mask image obtained in advance according to Expression (9).

[Expression. 9]

$$M = \min(\alpha \cdot g(|\overline{\Delta}|; \sigma), 1) \quad (9)$$

In Expression (9), the term "$\sigma$" represents a variance of a Gaussian distribution for a parameter shown in Expression (10). The term "$\alpha$" represents a spread of the Gaussian distribution. Expression (10) represents an average value of absolute values of respective brightness values of red, green, and blue at each pixel of the difference image $\Delta$.

It is described that the Gaussian distribution is used to calculate the mask image as an example in the above description, but any distribution such as Laplacian distribution may be used. It is described that the average value of the absolute values is used for the calculation of the norm of the difference image as an example, but any norm such as the L2 norm may be used. The mask image may be calculated for each brightness value.

[Expression.10]

$$|\overline{\Delta}| \quad (10)$$

In the above embodiments, it is described that the CNN is used as the neural networks of the encoder, the generator, and the predictor as an example, but the present invention is not limited thereto. The other neural network structure may be used and, for example, a recurrent neural network (RNN) or Fully Connected which are models in consideration of time series may be used. The RNN may be configured using long short-term memory (LSTM).

It is described that the output of the encoder is the latent variables $z_i$ and $z_a$ themselves as an example. However, the output of the encoder is not limited thereto. For example, the encoder may output parameters (for example, the average and standard deviation in the case of the Gaussian distribution) relating to the distribution of the latent variable so that the variable extraction unit 44 samples latent variables in accordance with the distribution parameters output from the encoder to obtain latent variable.

In the second embodiment, it is described, as an example, that the encoder estimates the latent variables $z_i$ ($z_1$, $z_2$, $z_3$) representing the identity, and the variable extraction unit predicts the latent variables $c_2'$ and $c_3'$ representing the attributes by using the approximate distribution estimated by the neural networks $Q_2$ and $Q_3$, and the prediction unit predicts $c_1$ using the predictor. However, the encoder may simultaneously estimate the latent variables $c_1$, $c_2$, and $c_3$ representing the attributes and the latent variables $z_i$ ($z_1$, $z_2$, $z_3$) representing the identity. Alternatively, the encoder may directly estimate the latent variables $c_2'$ and $c_3'$ representing the attributes instead of the latent variables $c_2$ and $c_3$ representing the attributes.

The signal retrieval device may input any latent variable $z_i$ representing the identity to the generator without using the encoder, update the latent variable $z_i$ representing the identity using the gradient method so that the image data output from the neural network G as the generator is closer to the target image x, and obtain the optimal latent variable $z_i$ representing the identity.

The signal retrieval device may obtain the latent variable $c_1$ representing the attribute using the predictor and obtain the latent variables $c_2'$ and $c_3'$ representing the attributes and the latent variables $z_i$ ($z_1$, $z_2$, $z_3$) representing the identity using the encoder. Furthermore, the signal retrieval device may input the latent variable $z_i$ representing the identity as an initial value to the generator with the obtained latent variables $c_1$, $c_2'$, $c_3'$, update the latent variable $z_i$ representing the identity using the gradient method so that the image data output from the neural network G as the generator is closer to the target image x, and obtain the optimal latent variable $z_i$ representing the identity.

When the signal retrieval device estimates the latent variables $c_2$ and $c_3$ representing the attributes simultaneously with the latent variable $z_i$ representing the identity using the neural network as the encoder, the latent variables $c_2'$ and $c_3'$ representing the attributes are obtained based on the estimated variables $c_2$ and $c_3$ representing the attributes and the predicted latent variable $c_1$ representing the attributes of the first layer. The latent variable $c_3'$ representing the attributes is obtained as follows.

The latent variable $c_2'$ representing attributes of the second layer is obtained by converting the latent variable $c_2$ representing attributes of the second layer by the value of the latent variable $c_1$ representing attributes of the first layer. The latent variable $c_3'$ representing attributes of the third layer is obtained by converting the latent variable $c_3$ representing attributes of the third layer by the value of the conversion result $c_2'$ of the latent variable $c_2$ representing attributes of the second layer.

The signal retrieval device may learn the encoder or the predictor together with the generator and the discriminator.

In the second embodiment, it is described, as an example, that the learning unit 30 predicts the latent variable $c_1$ representing attributes of the first layer from the image data included in the learning data and uses the predicted latent variable for learning. However, the present invention is not limited thereto, and the learning unit 30 may input the latent variable $c_1$ representing the attributes of the first layer as the learning data when learning each neural network.

The learning unit 30 may also input the latent variable representing the attributes of a predetermined hierarchy as the learning data in addition to the latent variable $c_1$ representing the attributes of the first layer so as to learn a deeper hierarchy.

In the first embodiment, it is described, as an example, that the attribute vector y is assigned to all pieces of image data x included in the learning data. However, the present invention is not limited thereto, and the attribute vector y may be assigned only for some pieces of image data x included in the learning data. Alternatively, the learning data may not include the attribute vector y. In this case, the signal retrieval device may estimate the attribute vector y in the same manner as the signal retrieval device according to the second embodiment estimates the latent variable $c_1$ representing the attributes corresponding to the attribute vector y. The signal retrieval device may learn each neural network based on the estimated attribute vector y.

In the case of the second embodiment, when a latent variable representing the attributes of a predetermined hierarchy is input as the learning data, a latent variable representing the attributes may be assigned for some pieces of image data x included in the learning data.

In addition, in the first and second embodiments, it is described, as an example, that the signal retrieval device modifies the attributes of both the input image data and the stored image data and retrieves the stored modified image data similar to the modified image data. However, the retrieving by the signal retrieval device is not limited thereto. For example, the signal retrieval device may modify the attribute of only the input image data and retrieve the stored image data similar to the modified image data. Alternatively, the signal retrieval device may modify the attribute of only the stored image data and retrieve the stored modified image data similar to the input image data.

It is described that the signal retrieval device according to the second embodiment converts the latent variable $c_i$ to obtain the latent variable $c_i'$ by a value of a latent variable $c_{i-1}'$ representing attributes of the immediately preceding layer. However, the signal retrieval device is not limited thereto, and the latent variable $c_i$ may be converted to obtain the latent variable $c_i'$ by at least one of the latent variables $c_j'$ ($j=1, 2, \ldots, i-1$) of a layer shallower than the layer corresponding to the latent variable $c_i'$. For example, in a case of obtaining the latent variable $c_i'$, the signal retrieval device may convert the latent variable $c_i$ by a latent variable $c_{i-2}'$ of a layer two shallower than the layer corresponding to the latent variable $c_i'$ to obtain the variable $c_i'$. Furthermore, the signal retrieval device may obtain the latent variable $c_i'$ based on a predetermined relationship between the latent variables $c_i'$ and the latent variables $c_j'$ ($j=1, 2, \ldots, i-1$) of a layer shallower than the layer corresponding to the latent variables $c_i'$.

In the generator 2 of the signal retrieval device according to the first embodiment, the neural network may perform the processing of converting the latent variable $z_a$ with the attribute vector y. The learning unit may perform the learning of the neural network to convert the latent variable $z_a$ together with the learning of the neural network G as the generator. In the generator 2 of the signal retrieval device according to the second embodiment, a neural network may perform the processing of converting the latent variable $c_i$ with the latent variable $c_{i-1}'$ to obtain the latent variable $c_i'$. The learning unit may perform the learning of the neural network to obtain the latent variable $c_i'$ together with the learning of the neural network $G_i$ as the generator.

It is described that the signal retrieval device according to the first embodiment generates the latent variables $z_i$ and $z_a$ using the random numbers based on the category distribution or the uniform distribution. However, the method of generating the latent variables $z_i$ and $z_a$ is not limited thereto. For example, the signal retrieval device may generate the latent variables $z_i$ and $z_a$ based on any distribution including the Gaussian distribution, the Dirichlet distribution, and the like. Similarly, the signal retrieval device according to the second embodiment may generate the latent variables $z_1$, $z_2$, $z_3$, $c_1$, $c_2$, and $c_3$ based on any distribution including the Gaussian distribution, the Dirichlet distribution, and the like. Alternatively, the signal retrieval devices according to the first and second embodiments may include a neural network that generates each of the latent variables.

It is described that the signal retrieval devices according to the first and second embodiments use the objective function represented by Expression (5) as the optimization condition in the pieces of learning of the neural network G as the generator and the neural network D as the discriminator. However, the objective function representing the optimization conditions in the a case of learning of the neural network G as the generator and the neural network D as the discriminator is not limited thereto. For example, the signal retrieval device may use any extended model including the least squares GAN, Wasserstein GAN, and the like.

It is described that the neural network D as the discriminator in the first and second embodiments discriminates whether the image data generated by the generator follows the same distribution as the true image data under the attribute vector. However, the target to be discriminated by the neural network D as the discriminator is not limited thereto. For example, the neural network D as the discriminator may discriminate whether the image data to be generated follows the same distribution as the true image data. In this case, the result of discriminating whether the image data includes the attribute vector may be added to the objective function in a case of learning of the neural network G as the generator and the neural network D as the discriminator. The fact that the image data includes the attribute vector means that the attributes (features) indicated by the attribute vector is included in the image data. For example, a neural network $Q_l$ ($l=1, 2, \ldots, L$) that estimates the approximate distributions of $P(c_1|x)$ and $P(c|x,p)$ may discriminate whether the image data includes the attribute vector.

When the result of discriminating whether the image data includes the attribute vector is added to the objective function as the optimization conditions, for example, the objective function is represented by Expression (11). In learning with the objective function represented by Expression (11), pieces of learning of the neural network G as the generator, the neural network D as the discriminator, and the neural network Ql (l=1, 2, . . . , L) that estimates the approximate distributions of $P(c_1|x)$ and $P(c|x,p)$ are performed simultaneously.

[Expression. 11]

$$\underset{G\ D}{\text{minmax}} \min_{Q_1,\dots,Q_L} \mathcal{L}_{GAN}(D, G) - \lambda_1 \mathcal{L}_{M1/AC}(G, Q_1) - \sum_{l=2}^{L} \lambda_l \mathcal{L}_{HCMl}(G, Q_l) \quad (11)$$

In Expression (11), the terms of "$\lambda_1, \dots, \lambda_L$" are trade-off parameters. The term "$L_{GAN}(D,G)$" is represented by Expression (12-1). The term "$L_{M1/AC}(G,Q_1)$" represents that any of $L_{M1}(G,Q_1)$ represented by Expression (12-2) or $LAC(G,Q_1)$ represented by Expression (12-3) is used. When the learning data does not include the attribute vector, $L_{M1}(G,Q_1)$ is used. When the learning data includes the attribute vector, $LAC(G,Q_1)$ is used. The term "$L_{HCMl}(G, Q_l)$" is represented by Expression (12-4).

[Expression. 12]

$$\mathcal{L}_{GAN}(D,G) = \mathbb{E}_{x \sim P_{data}(x)}[\log D(x)] + \mathbb{E}_{z \sim P_z(z)}[\log(1-D(G(z)))] \quad (12\text{-}1)$$

$$\mathcal{L}_{MI}(G,Q_1) = \mathbb{E}_{c_1 \sim P(c_1), x \sim G(\hat{c}_L, z)}[\log Q_1(c_1|x)] \quad (12\text{-}2)$$

$$\mathcal{L}_{AC}(G,Q_1) = \mathbb{E}_{c_1 \sim P(c_1), x \sim G(\hat{c}_L, z)}[\log Q_1(c_1|x)] + \mathbb{E}_{c_1, x \sim P_{data}(c_1,x)}[\log Q_1(c_1|x)] \quad (12\text{-}3)$$

$$\mathcal{L}_{HCMl}(G,Q_l) = \mathbb{E}_{c \sim P(c|p), x \sim G(\hat{c}_L, z)}[\log Q_l(c|x,p)] \quad (12\text{-}4)$$

In equations (12-1) to (12-4), the term "$x \sim P_{data}(x)$" represents that the true image data x is sampled from the learning data. The term "$z \sim P(z)$" represents that the latent variables $z(z_i, z_a)$ is generated from a certain data distribution. The term "$c_1 \sim P(c_1)$" represents that the attribute vector $c_i$ of the first layer is generated from a certain data distribution. The term "$x \sim G(\hat{c}_L, z)$" represents that the image data is generated by the neural network G as a generator based on the latent variable $\hat{c}_L$ representing attributes in an L hierarchy and the latent variables $z(z_i, z_a)$. The term "$c_1, x \sim P_{data}(c_1, x)$" represent that true image data x and the attribute vector $c_i$ corresponding to the image data x are sampled from the learning data. The term "$c \sim P(c|p)$" represents that the latent variable c is sampled in accordance with the distribution of $P(c|p)$. In Expression (12-4), the term "c" is a latent variable representing attributes of the l-layer, and the term "p" is a latent variable representing attributes of the (l-1)-th layer.

Figure 9:
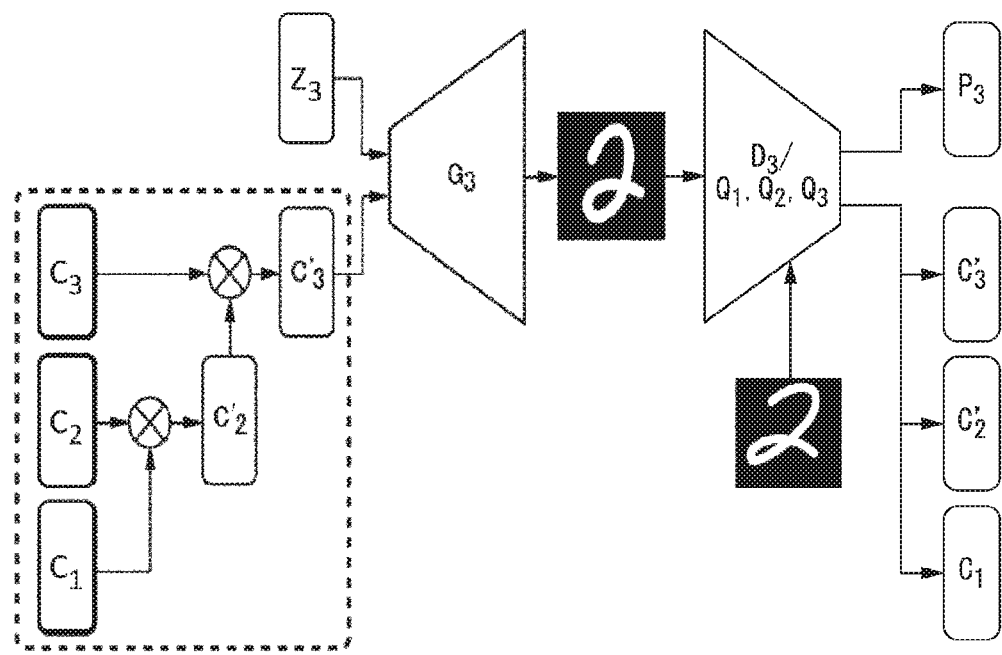
FIG. 9 is a diagram showing an example of a components of a learning unit according to the second embodiment.

In the signal retrieval device according to the second embodiment, when the discriminator discriminates whether the image data to be generated follows the same distribution as the true image data, the learning unit 30 may include a configuration having an one-layer neural network shown in FIG. 9 instead of the configuration having the three-layer neural network shown in FIG. 8. When the learning unit 30 includes the configuration of the one-layer neural network shown in FIG. 9, the learning unit 30 has a neural network $G_3$ operating as the generator, a neural network $D_3$ operating as the discriminator, and neural networks $Q_1$, $Q_2$, and $Q_3$ that estimate the distributions of the latent variables $c_1$, $c_2'$, and $c_3'$ representing the attributes.

In learning of each neural network, the learning unit 30 fixes parameters of other neural networks other than one learning target neural network and updates parameters of the one learning target neural network. The learning of each neural network included in the learning unit 30 is repeated for each piece of learning data, similarly to the learning described in the first and second embodiments.

When learning of the neural network $Q_1$ is performed, the learning unit 30 updates the parameters of the neural network $Q_1$ on the basis of the latent variables $c_2$ and $c_3$ set to predetermined initial values and latent variables $z_3$ and $c_1$ generated from a certain data distribution. When learning of the neural network $Q_2$ is performed, the learning unit 30 updates the parameters of the neural network $Q_2$ on the basis of a latent variable $c_3$ set to an initial value and latent variables $z_3$, $c_i$, and $c_2$ generated from a certain data distribution. When learning of the neural network $Q_3$ is performed, the learning unit 30 updates the parameters of the neural network $Q_3$ on the basis of the latent variables $z_3$, $c_1$, $c_2$, and $c_3$ generated from a certain data distribution.

The initial values set to the latent variables $c_2$ and $c_3$ representing attributes are determined on the basis of an expectation value or an average value of values that the latent variables $c_2$ and $c_3$ can take, for example. Alternatively, the initial values may be determined on the basis of the number of variables included in the latent variables $c_2$ and $c_3$. Learning of the neural networks $G_3$ and $D_3$ is similar to the learning described in the second embodiment.

The neural network D as the discriminator may discriminate whether image data includes an attribute vector. When the discriminator discriminates whether image data includes an attribute vector, the discriminator may further include a neural network that determines whether input image data includes each attribute.

The signal retrieval device may apply a known image processing technique for the generated image data. For example, the signal generation device may perform super-resolution processing or image-quality correction on the generated image.

INDUSTRIAL APPLICABILITY

The present invention is applicable to an application in which another signal similar to a signal even when the attribute included in the signal is modified is required to be retrieved.

REFERENCE SIGNS LIST

2: Generator
3: Discriminator
10: Input unit
20: Arithmetic unit
30: Learning unit
40: Neural network storage unit
42: Prediction unit
44: Variable extraction unit
46: Modification unit
48: Signal generation unit
49: Signal storage unit
50: Prediction unit
52: Variable extraction unit
62: Modification unit
64: Signal generation unit
65: Signal retrieval unit 66: Similar signal output unit
90: Output unit
100: Signal retrieval device

The invention claimed is:

1. A signal retrieval device comprising:
a variable extractor that extracts a plurality of latent variables representing features relating to stored signals stored in a signal storage, and an input signal or a signal generation source of the input signal;
a modifier that acquires a plurality of modified latent variables in which values of a part of the latent variables as a latent variable representing an attribute are modified and in which values of a part of the latent variables as a latent variable representing an individual identity of the input signal are maintained, among the extracted plurality of latent variables, the attribute indicating a feature of the target;
a signal generator that generates a modified signal based on the plurality of modified latent variables acquired by the modifier, wherein the modified signal corresponds to a modified input signal in which the attribute of the input signal is modified, and the signal generator also generates modified stored signals by modifying the latent variable representing the attribute of the stored signals; and
a signal retriever that retrieves a modified stored signal similar to the modified signal based on the modified signal and the modified stored signals generated by the signal generator, wherein
the variable extractor extracts the plurality of latent variables representing the features of the input signal from the input signal using a first neural network learned in advance for extracting the plurality of latent variables,
the signal generator generates the modified signal from the plurality of modified latent variables acquired by the modifier using a second neural network learned in advance for generating a signal,
the modified stored signals are generated, using the second neural network, from a plurality of modified latent variables in which a value of the latent variable representing the attribute is modified among the plurality of latent variables extracted from the stored signals stored in the signal storage, and
the signal retriever compares the modified signal generated by the signal generator with the modified stored signals to retrieve the modified stored signal similar to the modified signal.

2. A signal retrieval method comprising:
extracting a plurality of latent variables representing features relating to stored signals stored in a signal storage, and an input signal or a signal generation source of the input signal;
acquiring a plurality of modified latent variables in which values of a part of the latent variables as a latent variable representing an attribute are modified and in which values of a part of the latent variables as a latent variable representing an individual identity of the input signal are maintained, among the extracted plurality of latent variables, the attribute indicating a feature of the target;
generating a modified signal based on the plurality of modified latent variables acquired by the acquiring step, wherein the modified signal corresponds to a modified input signal in which the attribute of the input signal is modified;
generating modified stored signals by modifying the latent variable representing the attribute of the stored signals; and
retrieving a modified stored signal similar to the modified signal based on the modified signal and the modified stored signals generated by the generating step, wherein
in the extracting, the plurality of latent variables representing the features of the input signal are extracted from the input signal using a first neural network learned in advance for extracting the plurality of latent variables,
the modified signal is generated from the plurality of modified latent variables using a second neural network learned in advance for generating a signal,
the modified stored signals are generated, using the second neural network, from a plurality of modified latent variables in which a value of the latent variable representing the attribute is modified among the plurality of latent variables extracted from the stored signals stored in the signal storage, and
the modified stored signal similar to the modified signal is retrieved by comparing the modified signal with the modified stored signals.

3. A signal retrieval device for retrieving a stored signal similar to an input signal among stored signals stored in a signal storage, the signal retrieval device comprising:
a modifier that modifies a value of an attribute of a target represented by the stored signals stored in the signal storage while maintaining an individual identity of the target to acquire a plurality of modified values of the attribute, the attribute indicating a feature of the target;
a signal retriever that retrieves the stored signal similar to the input signal among the stored signals using a plurality of modified signals, which are represented by the stored signals with their attribute modified according to each of the plurality of modified values of the attribute acquired by the modifier; and
a variable extractor that acquires a plurality of latent variables including a first latent variable and a second latent variable from the input signal or the stored signals, the first latent variable representing a feature corresponding to an individual identity of the target among features of the input signal and the stored signals, and the second latent variable being independent of the first latent variable and representing a feature corresponding to the attribute of the target among the features of the input signal and the stored signals,
wherein the modifier modifies the second latent variable of the plurality of latent variables of the input signal and the modified stored signals to update the plurality of latent variables, the second latent variable corresponding to an attribute to be modified, and
wherein the signal retriever retrieves a signal similar to the input signal from the stored signals using a modified input signal obtained by modifying the input signal based on the second latent variable modified by the modifier and a modified stored signals obtained by modifying the stored signals based on the second latent variable modified by the modification.

4. The signal retrieval device according to claim 3, further comprising:
a signal generator that provides at least one neural network learned in advance with the plurality of latent variables updated by the modifier to generate a signal in which the attribute to be modified is modified, wherein the signal retriever uses, as the modified input signal or the modified stored signals, signals generated by the signal generator when the input signal or the stored signals are provided to the variable extractor to retrieve a signal similar to the input signal from the stored signals.

5. The signal retrieval device according to claim 4, wherein
the at least one neural network includes a first neural network as a generator and a second neural network as a discriminator,
the first neural network generates a signal base on the first latent variable, the second latent variable and an attribute vector indicating attributes of a signal to be generated,
the second neural network discriminates whether the signal generated by the first neural network follows the same distribution as the true signal, and
the first and second neural networks have learned in accordance with competitive optimization conditions.

6. A signal retrieval device comprising:
a variable extractor that acquires a first latent variable and a second latent variable by providing a first neural network with a signal as an input, the first neural network being learned in advance as an encoder, the first latent variable representing a feature corresponding to an individual identity of the signal among features relating the signal or a signal generation source of the signal, and the second latent variable being independent of the first latent variable and representing a feature corresponding to an attribute of the signal among the features relating the signal or the signal generation source,
a signal generator that generates a modified signal by providing a second neural network with the first latent variable acquired by the variable extractor and a modified second latent variable in which at least one latent variable of the second latent variable extracted by the variable extractor is modified, the second neural network being learned in advance as a generator, and
a signal retriever that retrieves a signal similar to a modified input signal from modified stored signals, the modified input signal being generated by the signal generator when an input signal is provided as the input to the variable extractor, and the modified stored signals being generated by the signal generator when stored signals stored in a signal storage are provided as the input to the variable extractor.

7. A non-transitory computer-readable medium storing a program which, when executed by a computer, causes the computer to function as the signal retrieval device according to claim 3.

* * * * *